US009485267B2

(12) United States Patent
Baxley et al.

(10) Patent No.: US 9,485,267 B2
(45) Date of Patent: Nov. 1, 2016

(54) ANOMALOUS BEHAVIOR DETECTION USING RADIO FREQUENCY FINGERPRINTS AND ACCESS CREDENTIALS

(71) Applicant: Bastille Networks, Inc., Atlanta, GA (US)

(72) Inventors: Robert John Baxley, Atlanta, GA (US); Christopher Jay Rouland, Atlanta, GA (US); Michael Thomas Engle, Holmdel, NJ (US)

(73) Assignee: Bastille Networks, Inc., Atlanta, GA (US)

( * ) Notice: Subject to any disclaimer, the term of this patent is extended or adjusted under 35 U.S.C. 154(b) by 21 days.

(21) Appl. No.: 14/610,659

(22) Filed: Jan. 30, 2015

(65) Prior Publication Data

US 2015/0350902 A1 Dec. 3, 2015

Related U.S. Application Data

(60) Provisional application No. 62/006,605, filed on Jun. 2, 2014.

(51) Int. Cl.
| | |
|---|---|
| *H04L 29/06* | (2006.01) |
| *H04W 4/22* | (2009.01) |
| *H04W 4/02* | (2009.01) |
| *G07C 9/00* | (2006.01) |
| *H04B 17/391* | (2015.01) |
| *H04W 12/06* | (2009.01) |
| *H04W 12/08* | (2009.01) |
| *H04B 17/318* | (2015.01) |

(52) U.S. Cl.
CPC ....... *H04L 63/1425* (2013.01); *G07C 9/00031* (2013.01); *G07C 9/00111* (2013.01); *H04B 17/318* (2015.01); *H04B 17/391* (2015.01); *H04L 63/0853* (2013.01); *H04L 63/20* (2013.01); *H04W 4/027* (2013.01); *H04W 4/22* (2013.01); *H04W 12/06* (2013.01); *H04W 12/08* (2013.01)

(58) Field of Classification Search
CPC ... H04L 63/08; H04L 63/0853; H04L 63/20; H04L 9/3234; H04L 63/1425; H04W 12/08; H04W 12/06; H04W 4/22; H04W 4/027; G06F 21/00; G06F 21/31; G06F 21/34; G07C 9/00031; G07C 9/00111; H04B 17/318; H04B 17/391
USPC ........................................................ 726/7
See application file for complete search history.

(56) References Cited

U.S. PATENT DOCUMENTS

| | | | |
|---|---|---|---|
| 7,072,668 | B2 | 7/2006 | Chou |
| 7,782,207 | B2 | 8/2010 | Gillard et al. |
| 8,159,329 | B1 | 4/2012 | Killian et al. |
| 8,537,014 | B2 | 9/2013 | Broer |

(Continued)

OTHER PUBLICATIONS

Search Report and Written Opinion for International Application No. PCT/US2015/033826 dated Sep. 15, 2015.

*Primary Examiner* — Yogesh Paliwal
(74) *Attorney, Agent, or Firm* — Sutherland Asbill & Brennan LLP

(57) ABSTRACT

Electromagnetic (EM)/radio frequency (RF) emissions may be detected and corresponding EM personas may be created. One or more EM personas may be associated with a super persona corresponding to a particular entity. EM personas, super personas, and/or supplemental identifying information can be used to enforce security protocols.

20 Claims, 21 Drawing Sheets

EXAMPLE EM PERSONA DETECTION ENVIRONMENT

(56) References Cited

U.S. PATENT DOCUMENTS

| | | |
|---|---|---|
| 8,744,375 B2 | 6/2014 | Raghuraman |
| 2003/0001743 A1 | 1/2003 | Menard |
| 2004/0028003 A1 | 2/2004 | Diener et al. |
| 2006/0216011 A1* | 9/2006 | Godehn .................. G01S 3/046 396/58 |
| 2007/0011099 A1 | 1/2007 | Sheehan |
| 2008/0076572 A1 | 3/2008 | Nguyen et al. |
| 2008/0238617 A1 | 10/2008 | Kuhl et al. |
| 2010/0121762 A1 | 5/2010 | Boyle et al. |
| 2010/0265068 A1 | 10/2010 | Brackmann et al. |
| 2011/0077758 A1 | 3/2011 | Tran et al. |
| 2011/0148633 A1 | 6/2011 | Kohlenberg et al. |
| 2012/0032834 A1 | 2/2012 | Weeks |
| 2012/0315978 A1 | 12/2012 | LeMay et al. |
| 2013/0053059 A1* | 2/2013 | Kruglick ............... G01S 5/0252 455/456.1 |
| 2013/0095848 A1* | 4/2013 | Gold ..................... H04W 4/023 455/456.1 |
| 2013/0344886 A1 | 12/2013 | Jarvis et al. |
| 2014/0004878 A1 | 1/2014 | Park et al. |
| 2014/0080578 A1 | 3/2014 | Nguyen |
| 2014/0094149 A1 | 4/2014 | Claussen et al. |
| 2014/0128032 A1 | 5/2014 | Muthukumar |
| 2015/0091713 A1 | 4/2015 | Kohlenberg et al. |

* cited by examiner

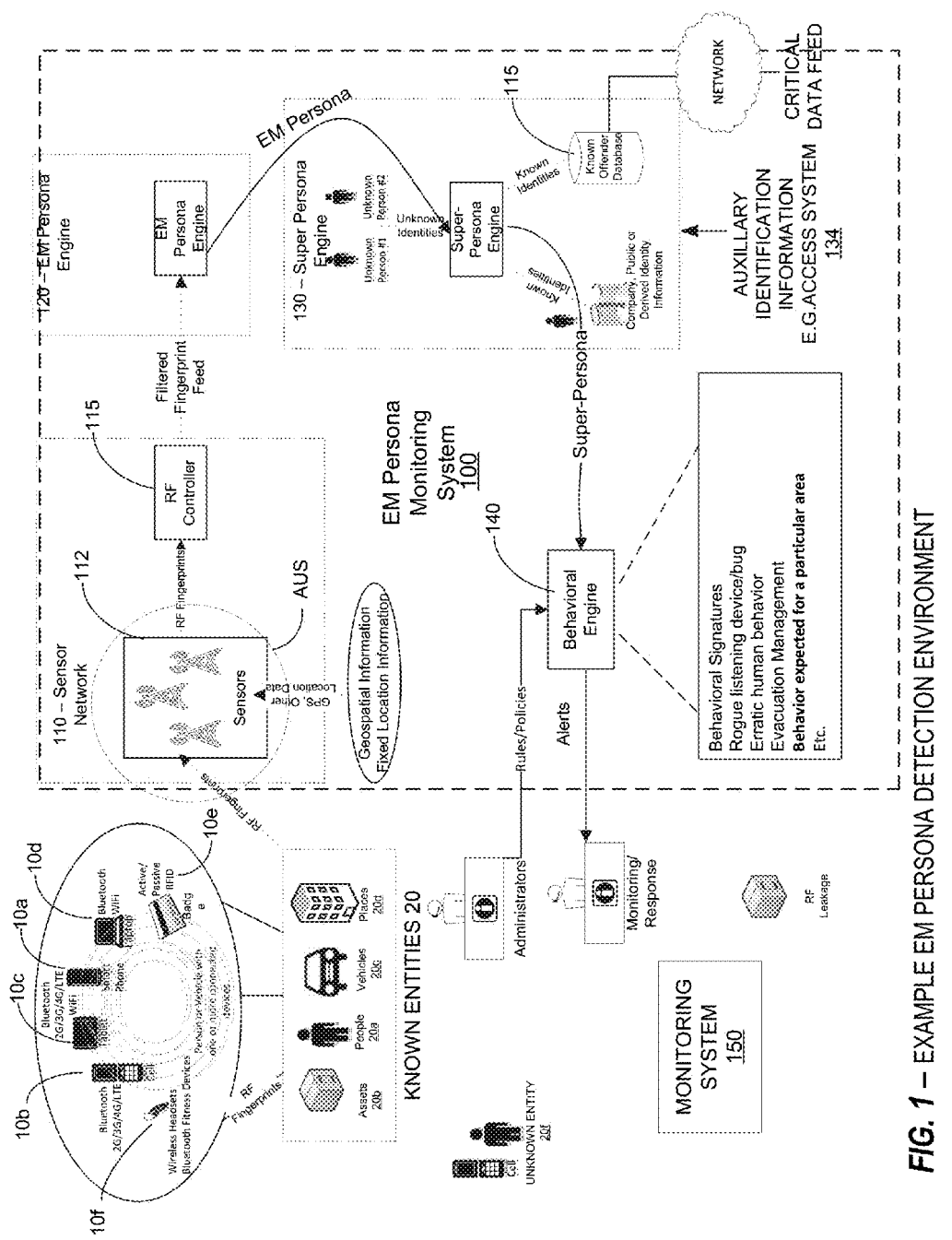
*FIG. 1* – EXAMPLE EM PERSONA DETECTION ENVIRONMENT

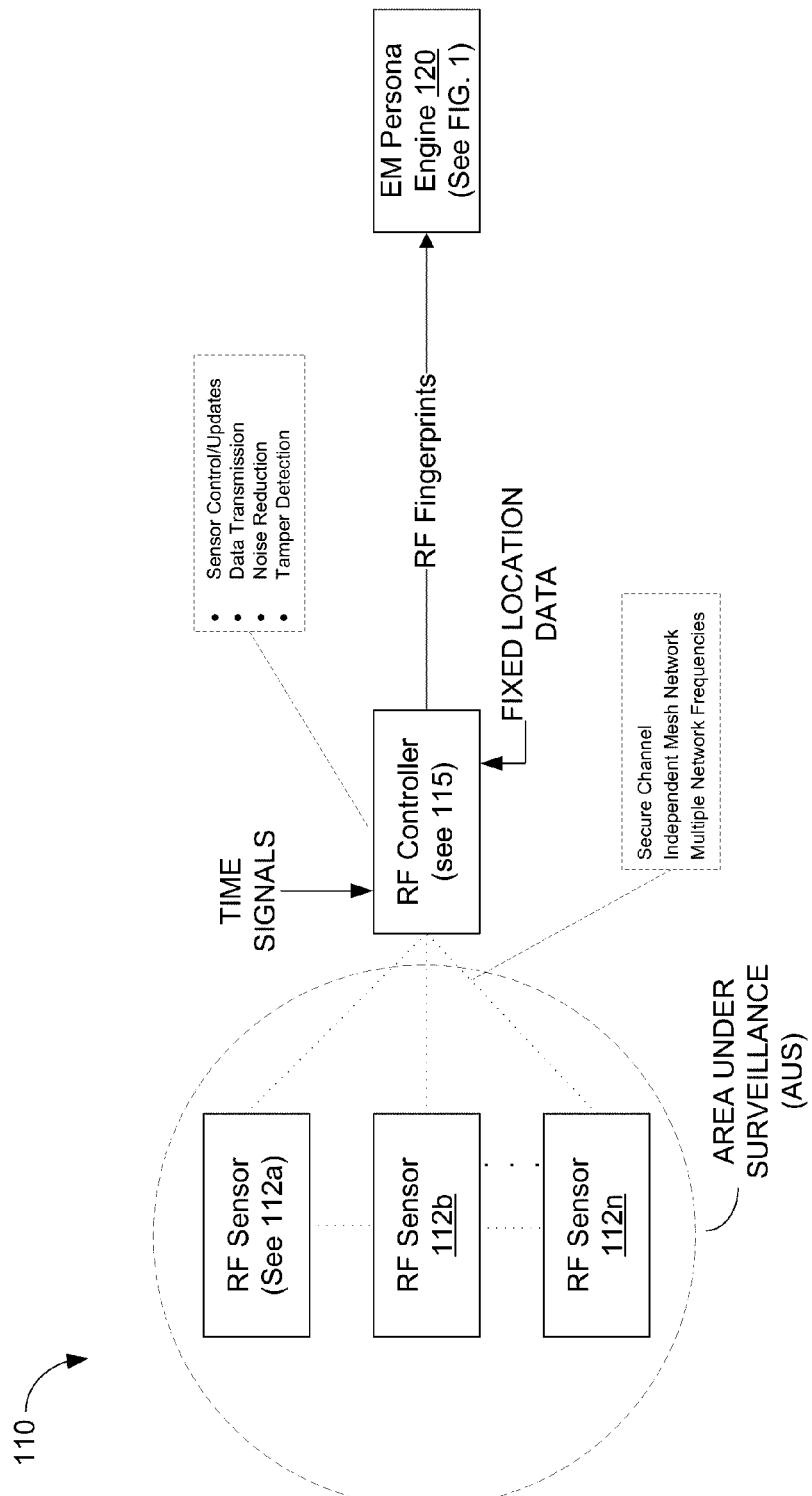
FIG. 2A – EXAMPLE SENSOR NETWORK ARCHITECTURE

| DEVICE TYPE INDENTIFIER | DEVICE IDENTIFIER | RADIO TYPE IDENTIFIER | MODULATION SCHEME |
|---|---|---|---|
| LOCATION OF DEVICE | RF SENSOR IDENTIFIER | TIME | SIGNAL STRENGTH |

*FIG. 2B* – EXAMPLE RF FINGERPRINT DATA SCHEMA

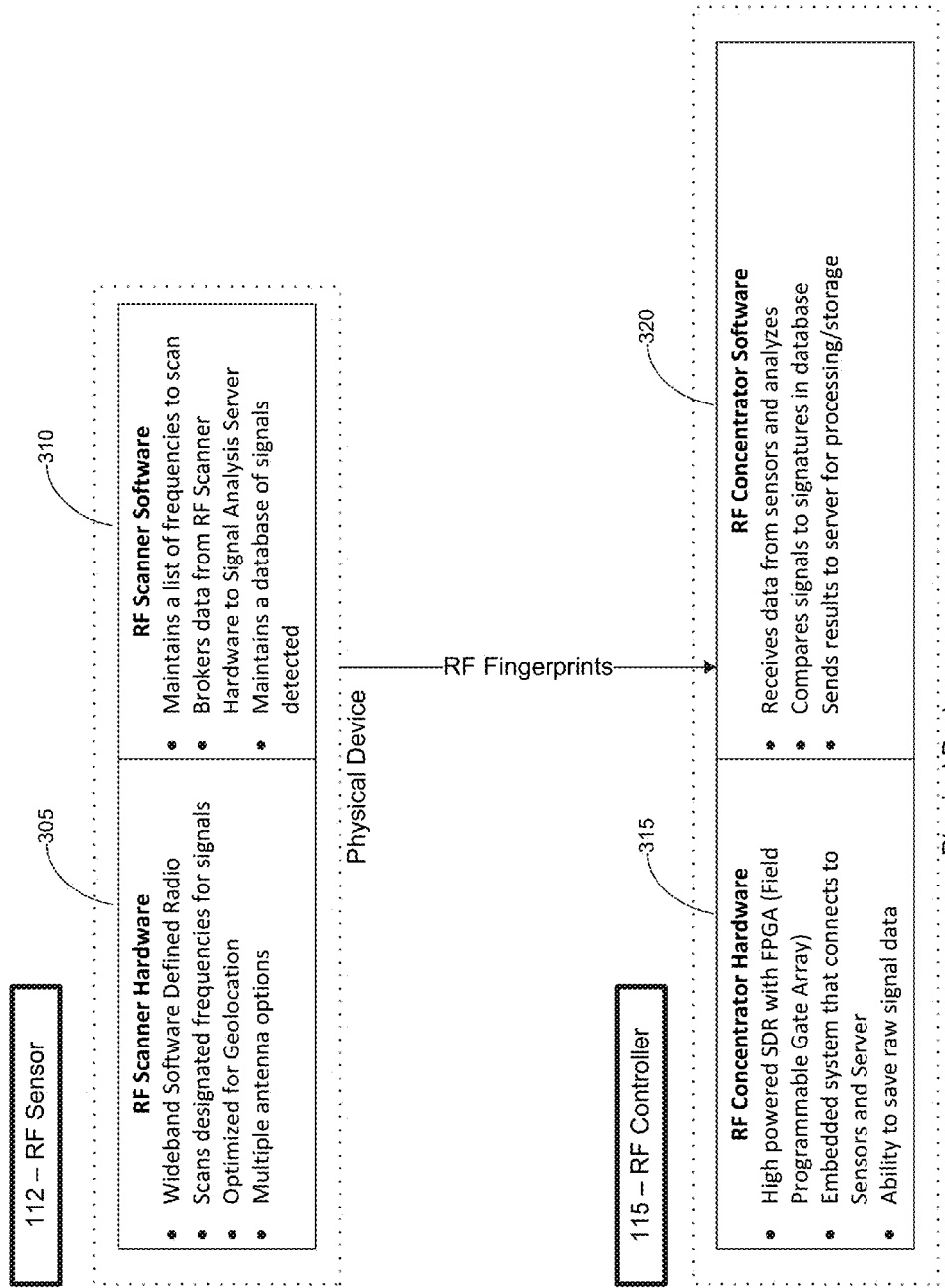
FIG. 3 – EXAMPLE RF SENSOR ARCHITECTURE

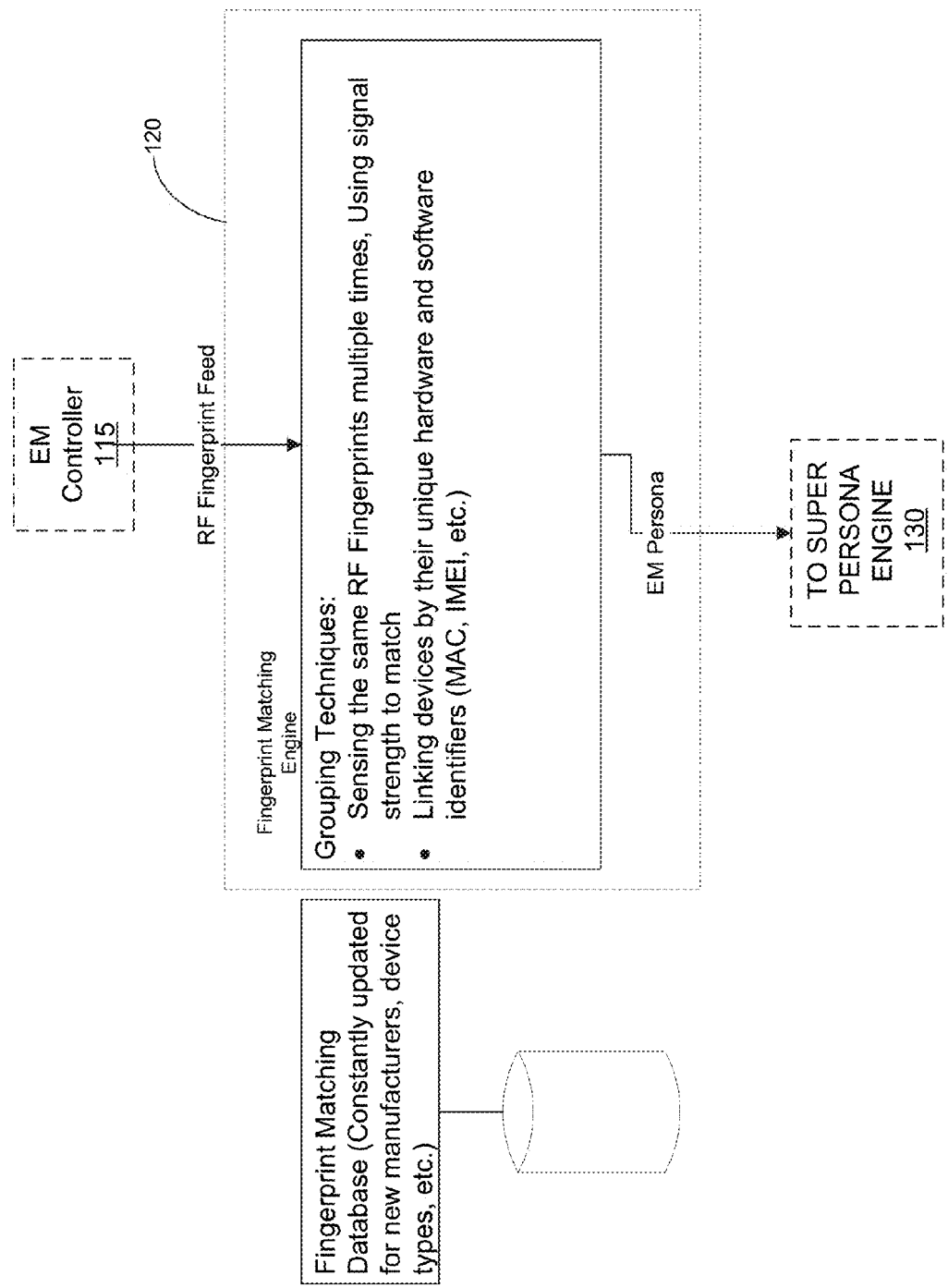
FIG. 4A – EXAMPLE EM PERSONA ENGINE ARCHITECTURE

| PERSONA IDENTIFIER | ENTITY NAME | DEVICE IDENTIFIER INFORMATION | TIME OF CREATION |
|---|---|---|---|
| TIME OF LAST MODIFICAITON | LOCATION INFORMATION | | |

*FIG. 4B* – EXAMPLE EM PERSONA DATA SCHEMA

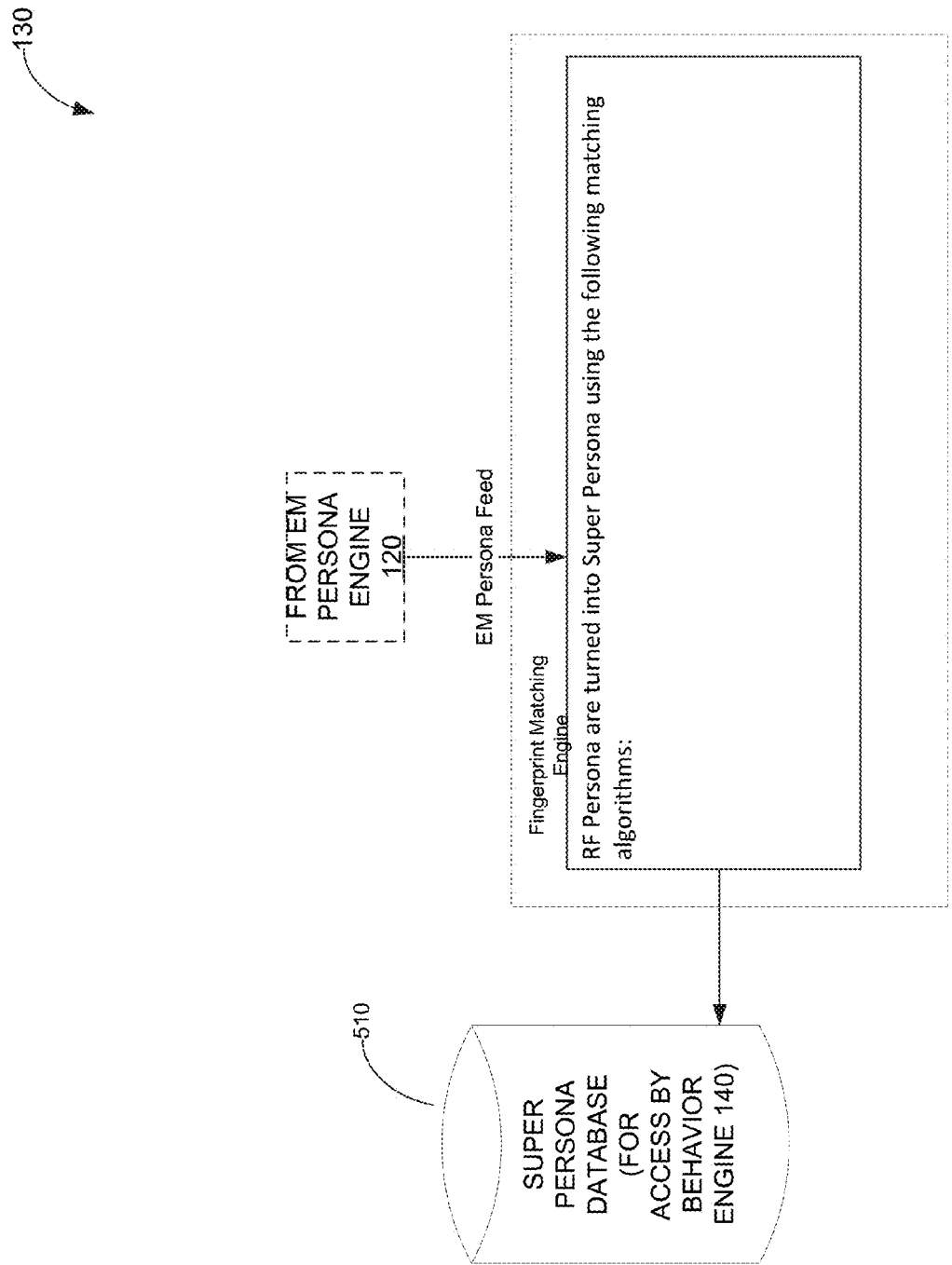
FIG. 5A – EXAMPLE SUPER PERSONA ENGINE ARCHITECTURE

| SUPER PERSONA IDENTIFIER | ENTITY NAME | TIME OF CREATION | TIME OF CREATION |
|---|---|---|---|
| TIME LAST MODIFIED | BEHAVIOR EXPECTATION | ASSOCIATION INFORMATION | EXPECTED LOCATION INFORMATION |

*FIG. 5B* – EXAMPLE SUPER PERSONA DATA SCHEMA

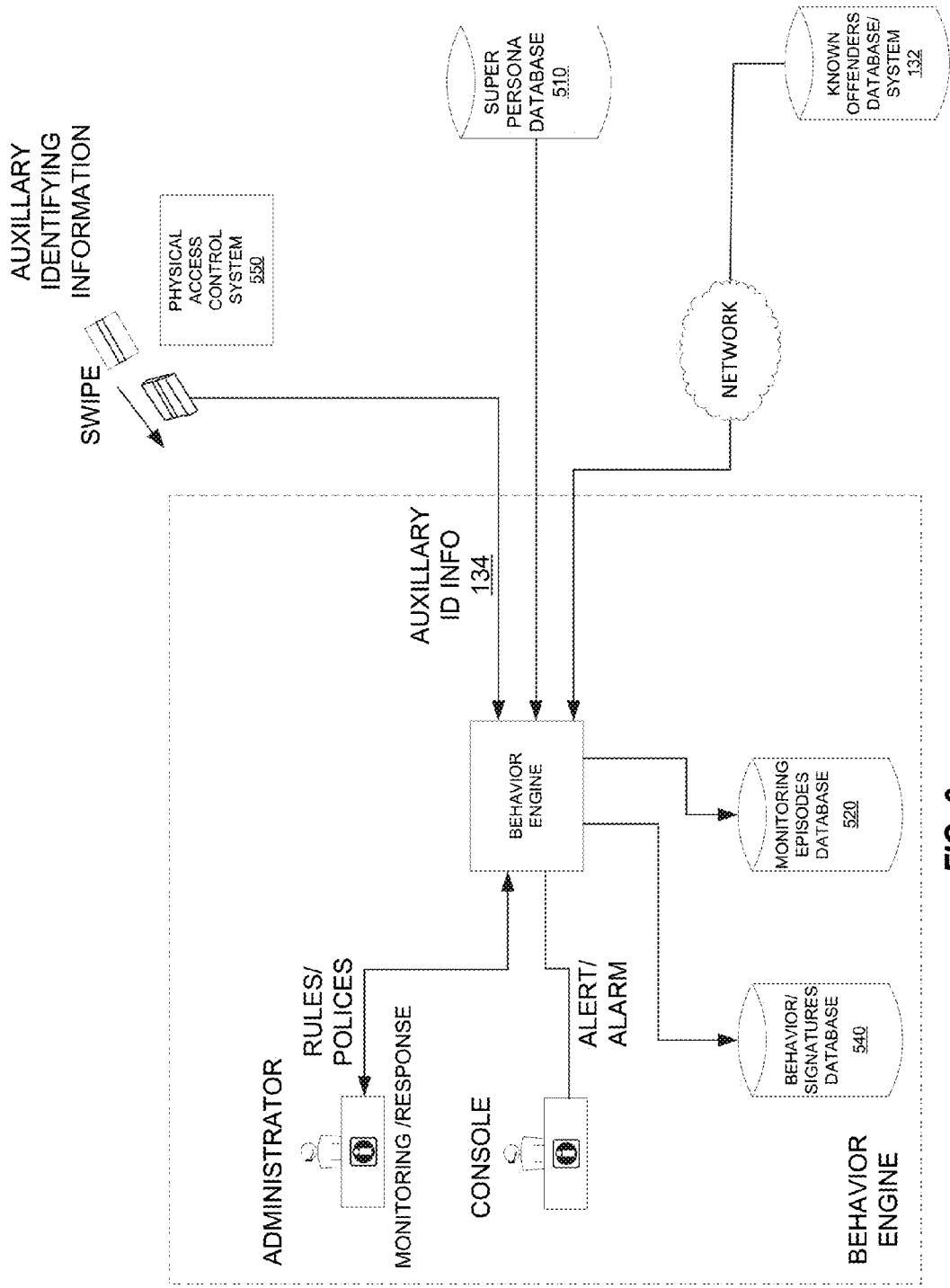
FIG. 6 – EXAMPLE BEHAVIOR ENGINE

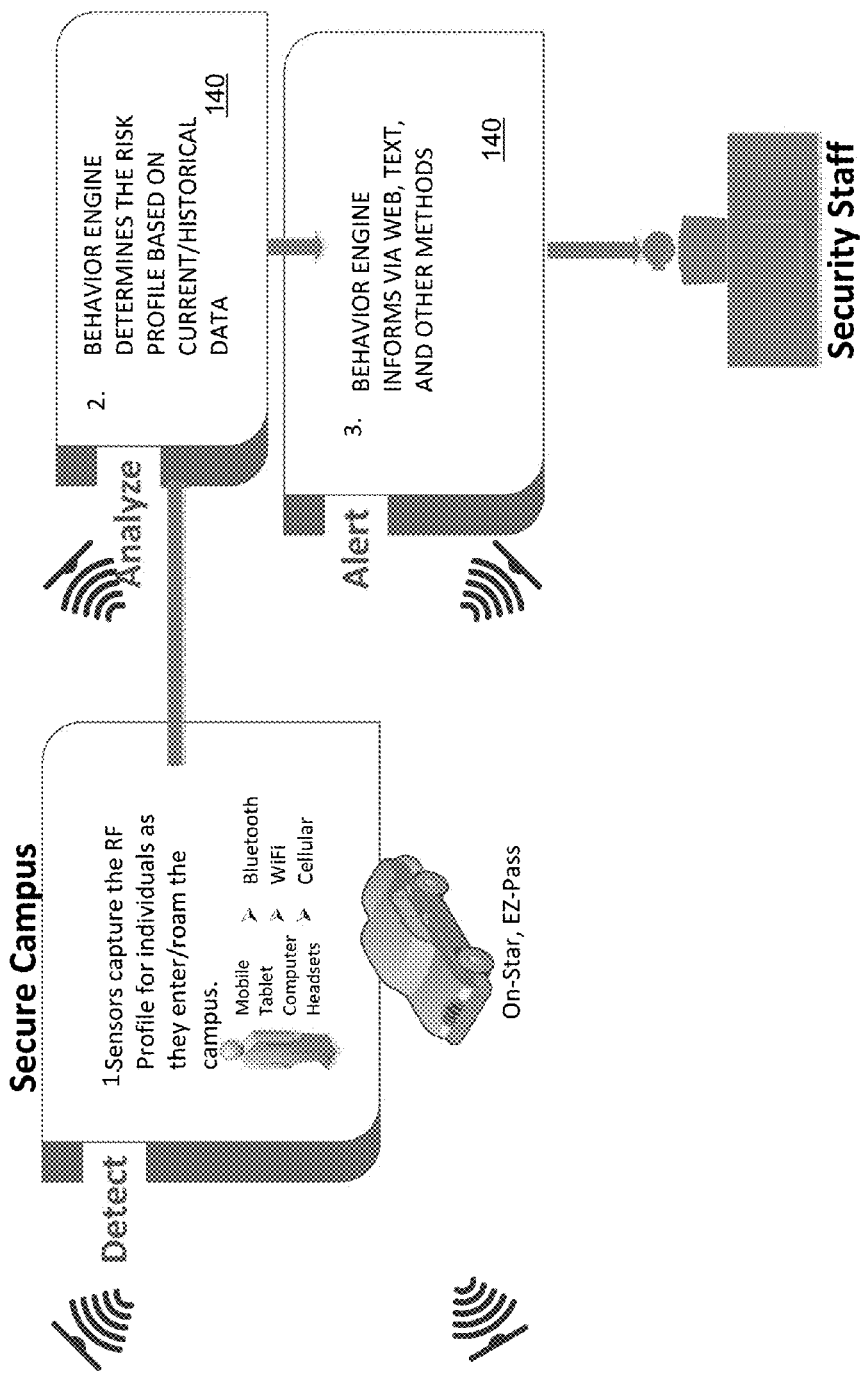
FIG. 7 – EXAMPLE CAMPUS PERSONA MONITORING SCENARIO

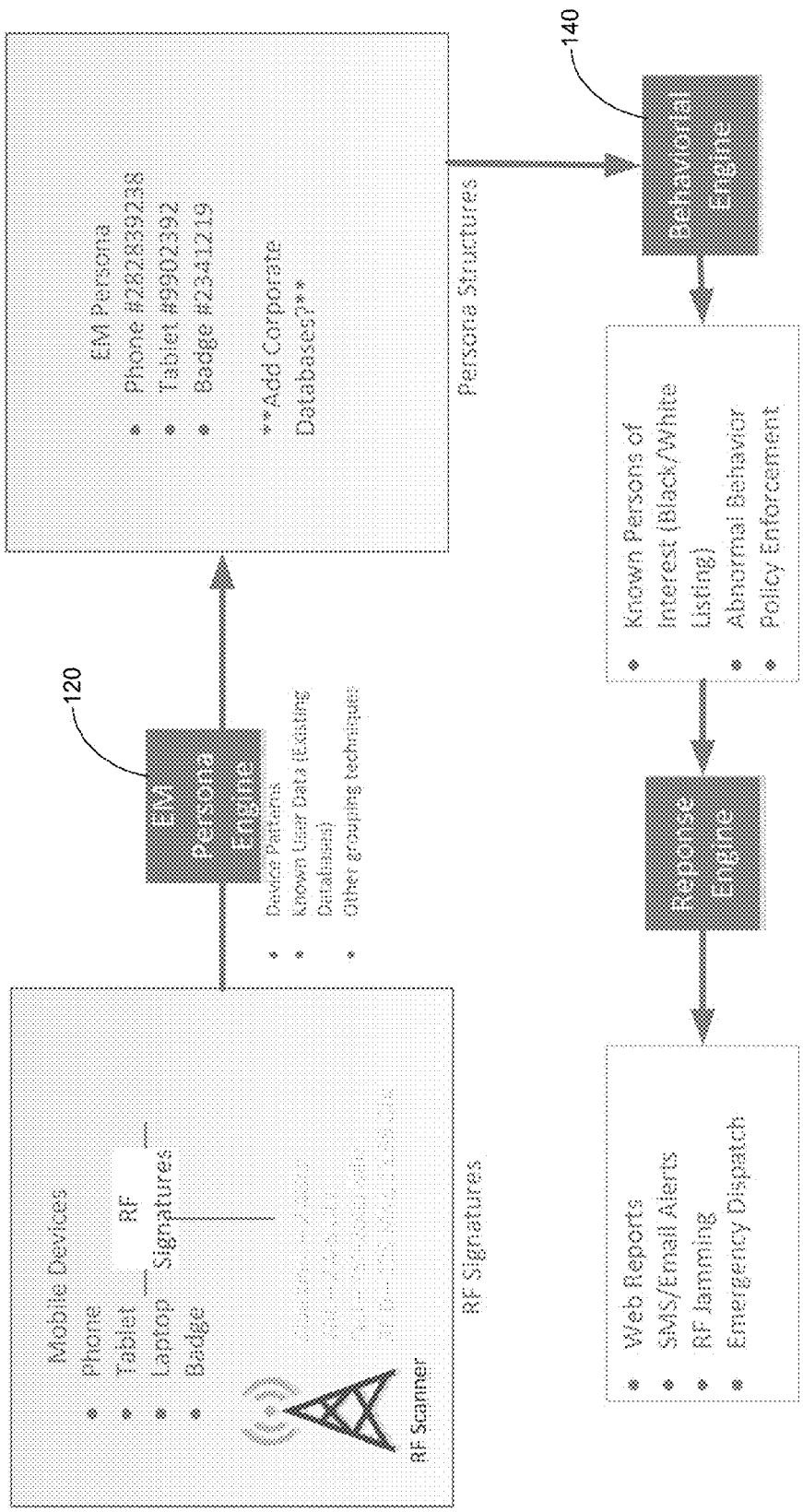
*FIG. 8* – EXAMPLE RF PERSONA MONITORING SYSTEM ARCHITECTURE

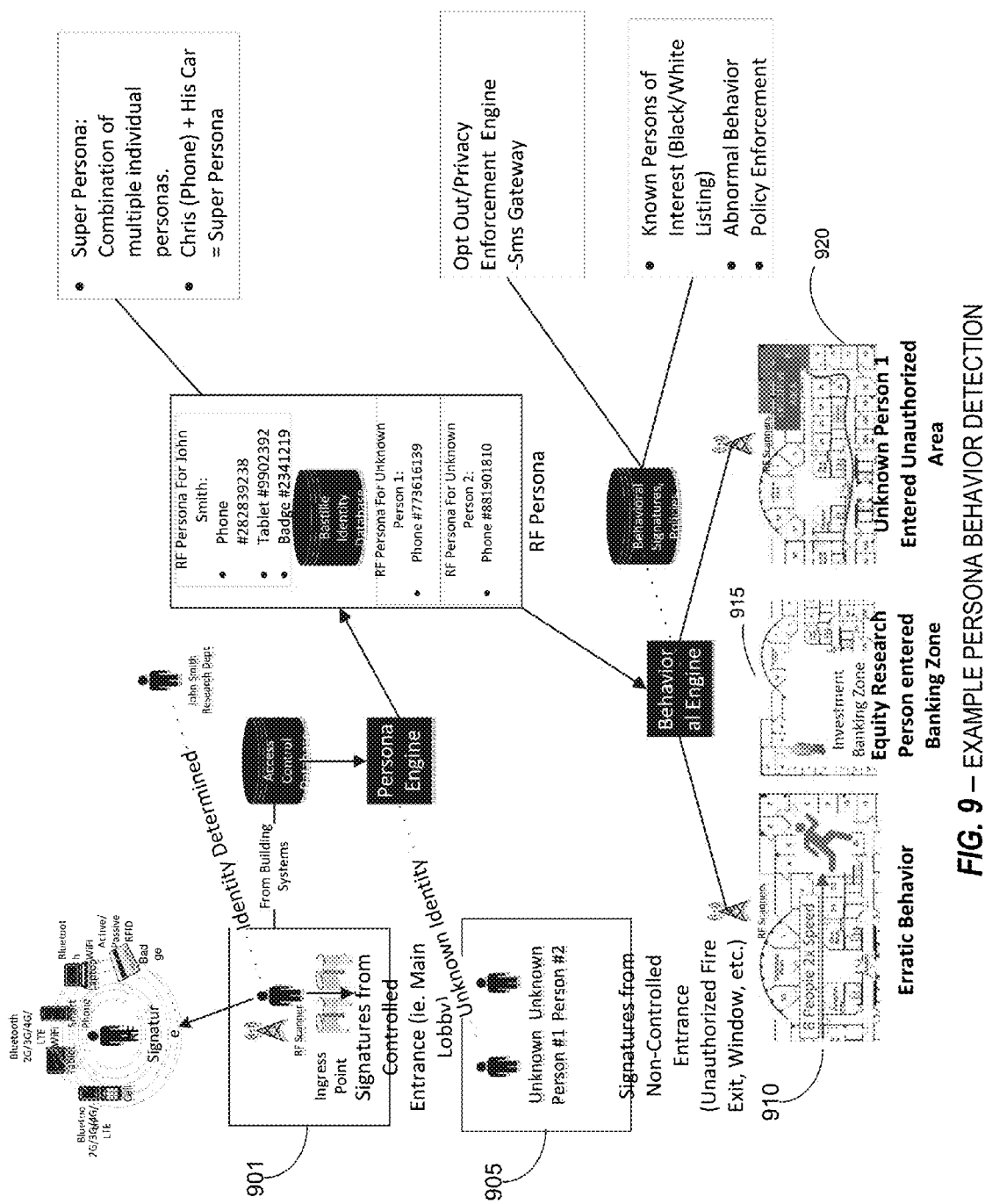
FIG. 9 – EXAMPLE PERSONA BEHAVIOR DETECTION

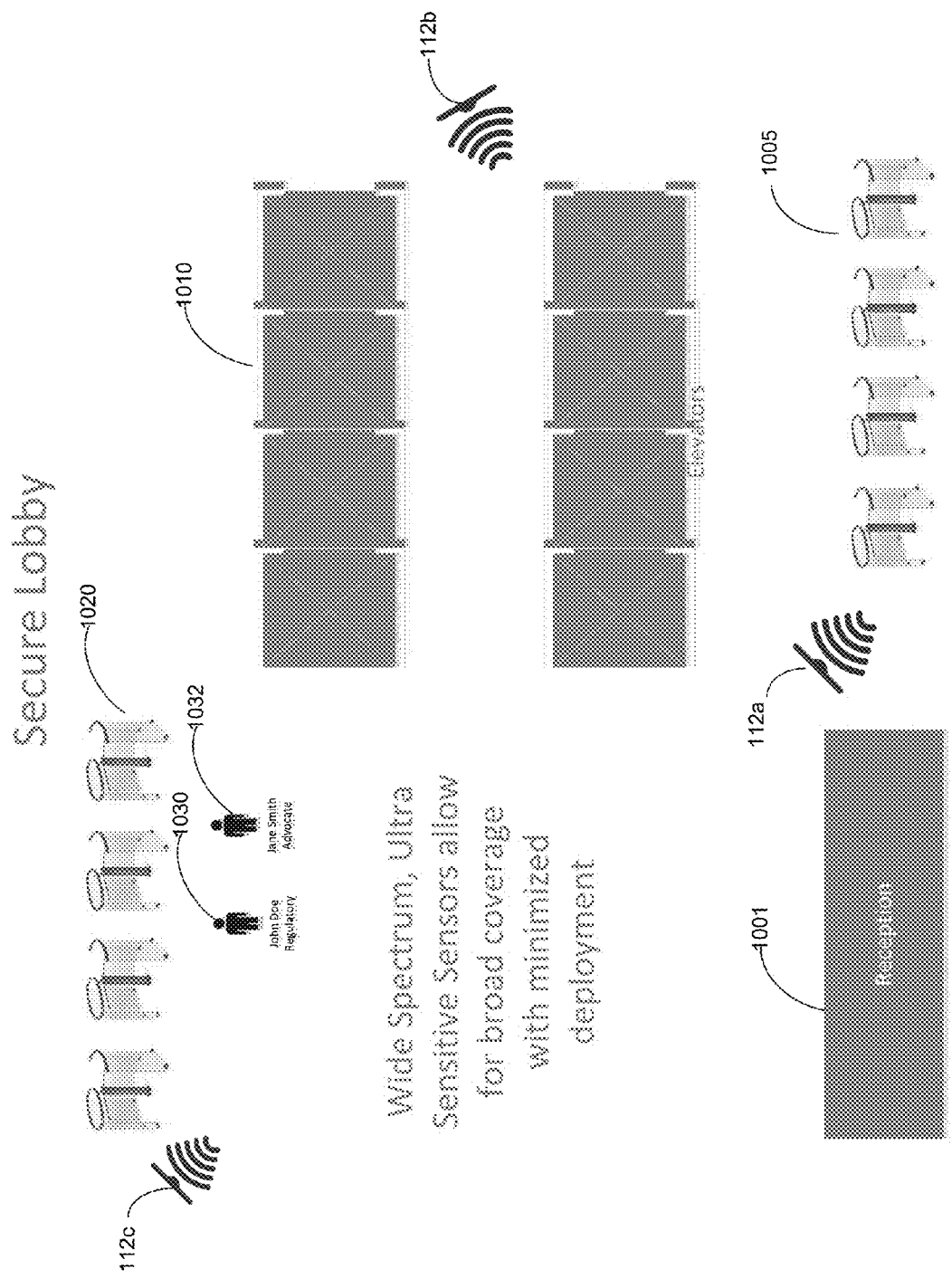
FIG. 10 – EXAMPLE BUILDING LOBBY RF PERSONA IDENTIFICATION ENVIRONMENT

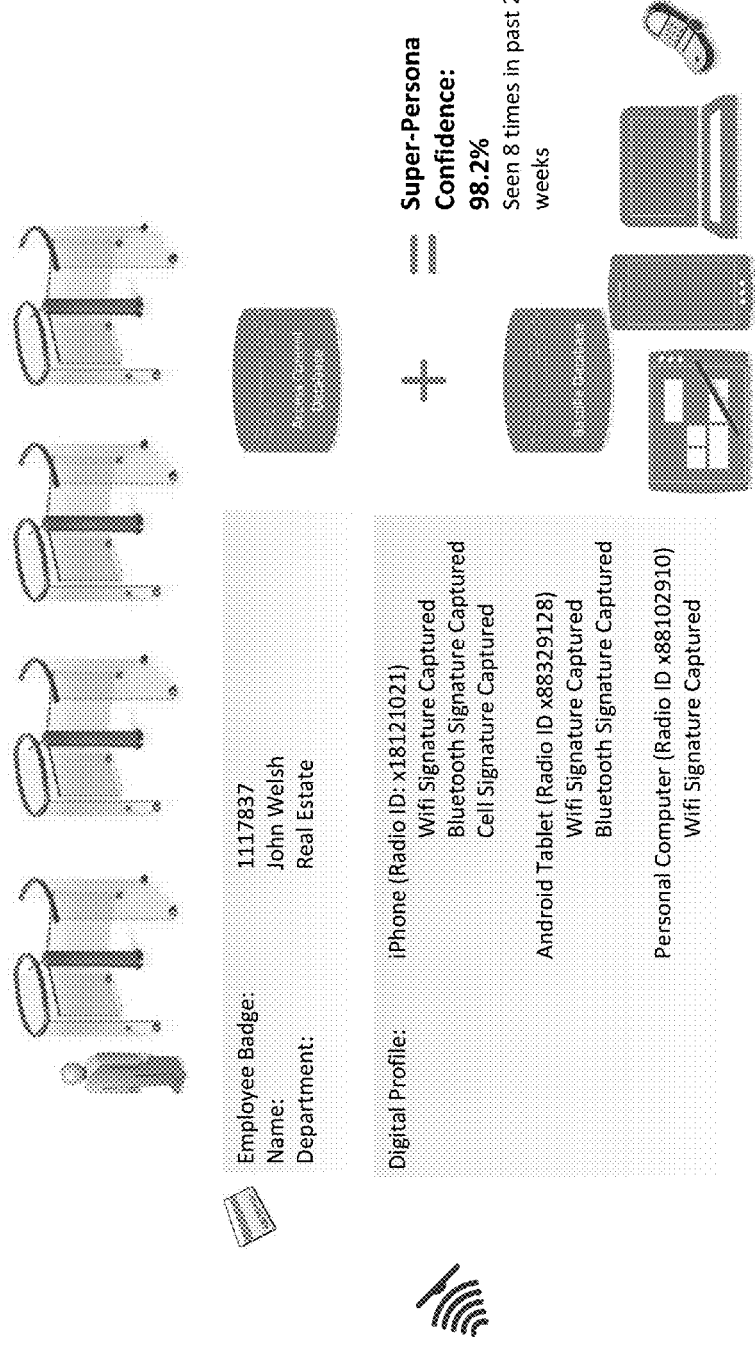
FIG. 11 – EXAMPLE BLOCK DIAGRAM OF RF PERSONA CREATION VIA BUILDING INGRESS

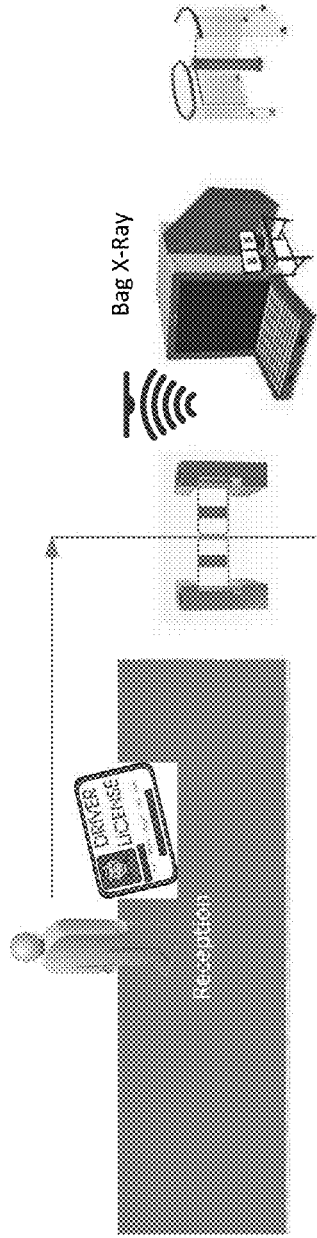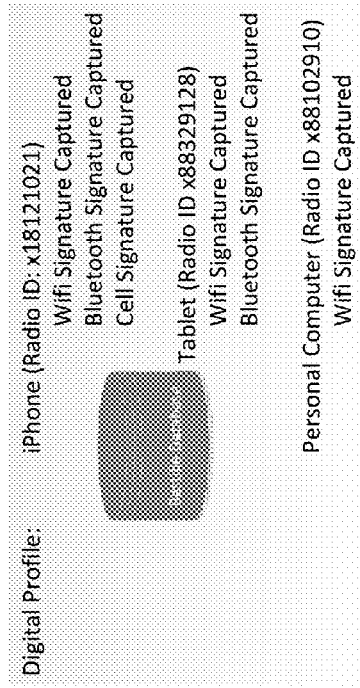
FIG. 12 – EXAMPLE BLOCK DIAGRAM OF VISITOR RF PERSONA CREATION

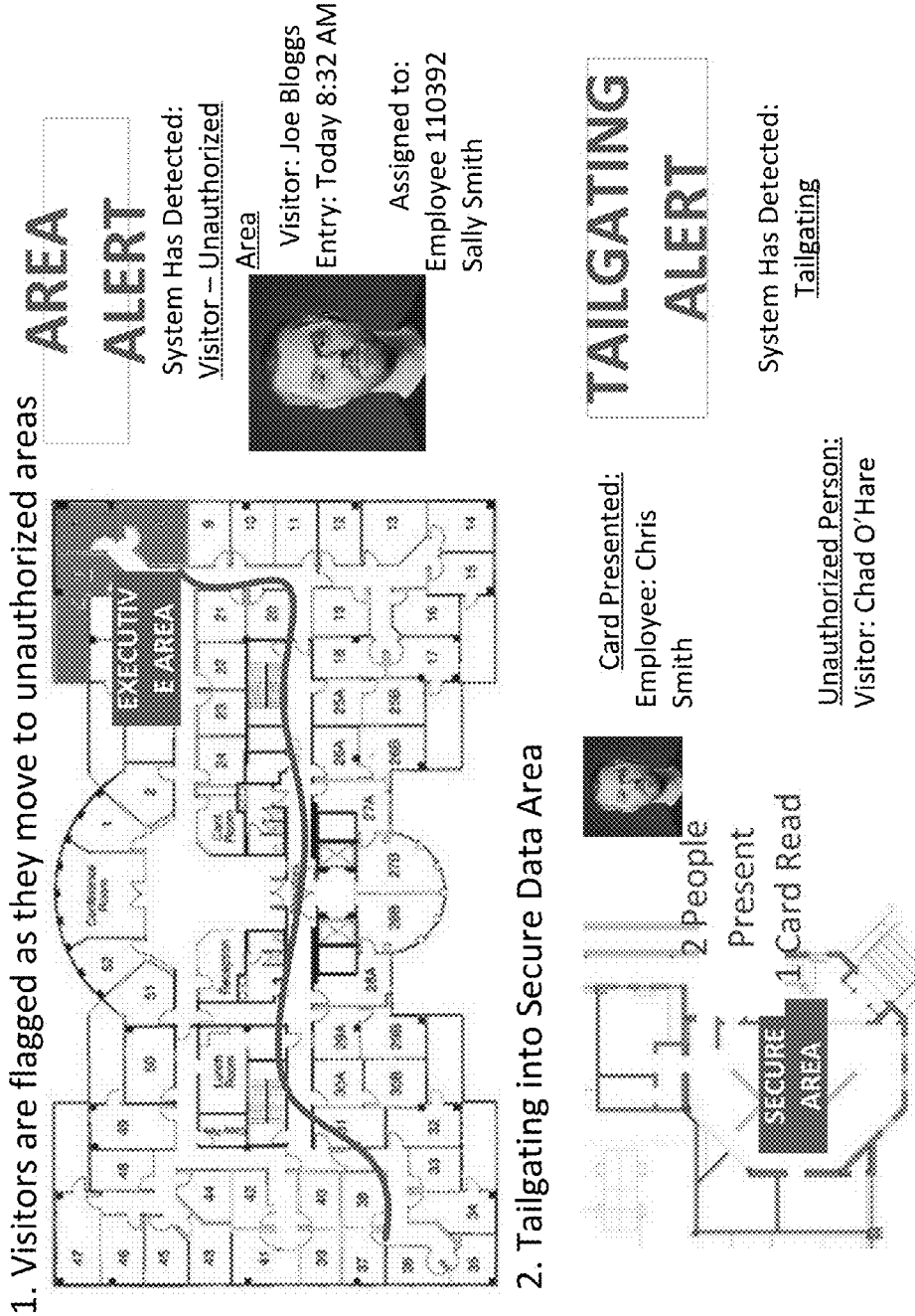
FIG. 13 – EXAMPLE BLOCK DIAGRAM OF BEHAVIOR DETECTION AND ENFORCEMENT

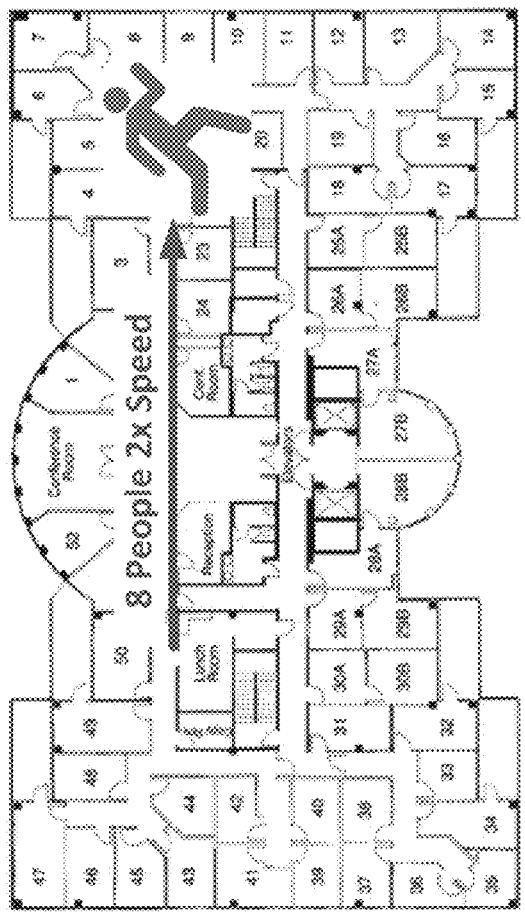
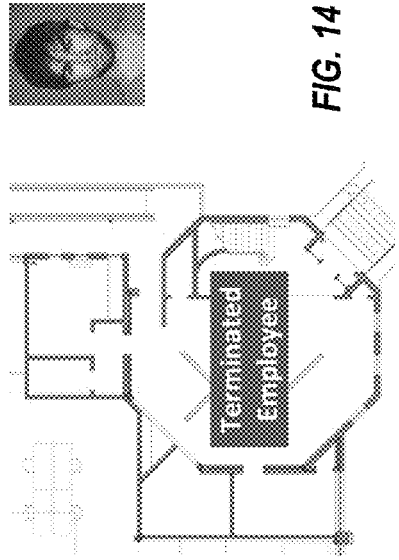
FIG. 14 – EXAMPLE BLOCK DIAGRAM OF BEHAVIOR DETECTION AND ENFORCEMENT

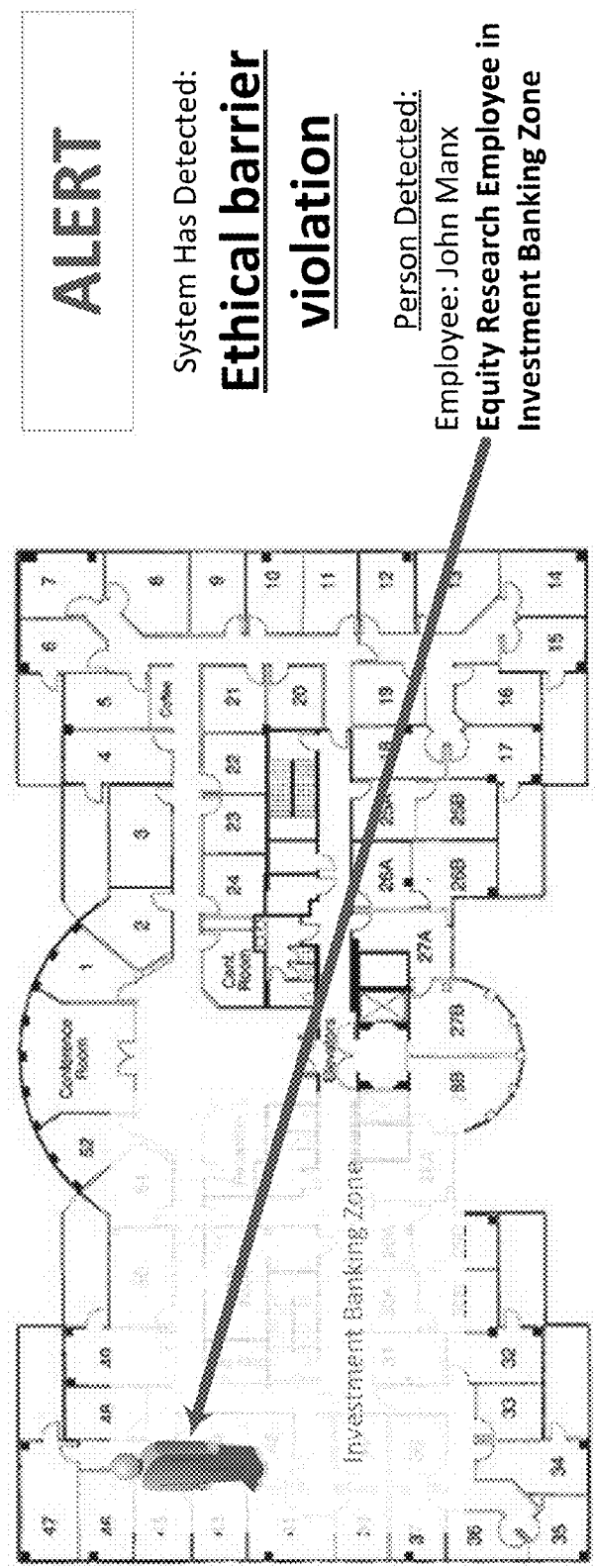
FIG. 15 – EXAMPLE BLOCK DIAGRAM OF BEHAVIOR DETECTION AND ENFORCEMENT

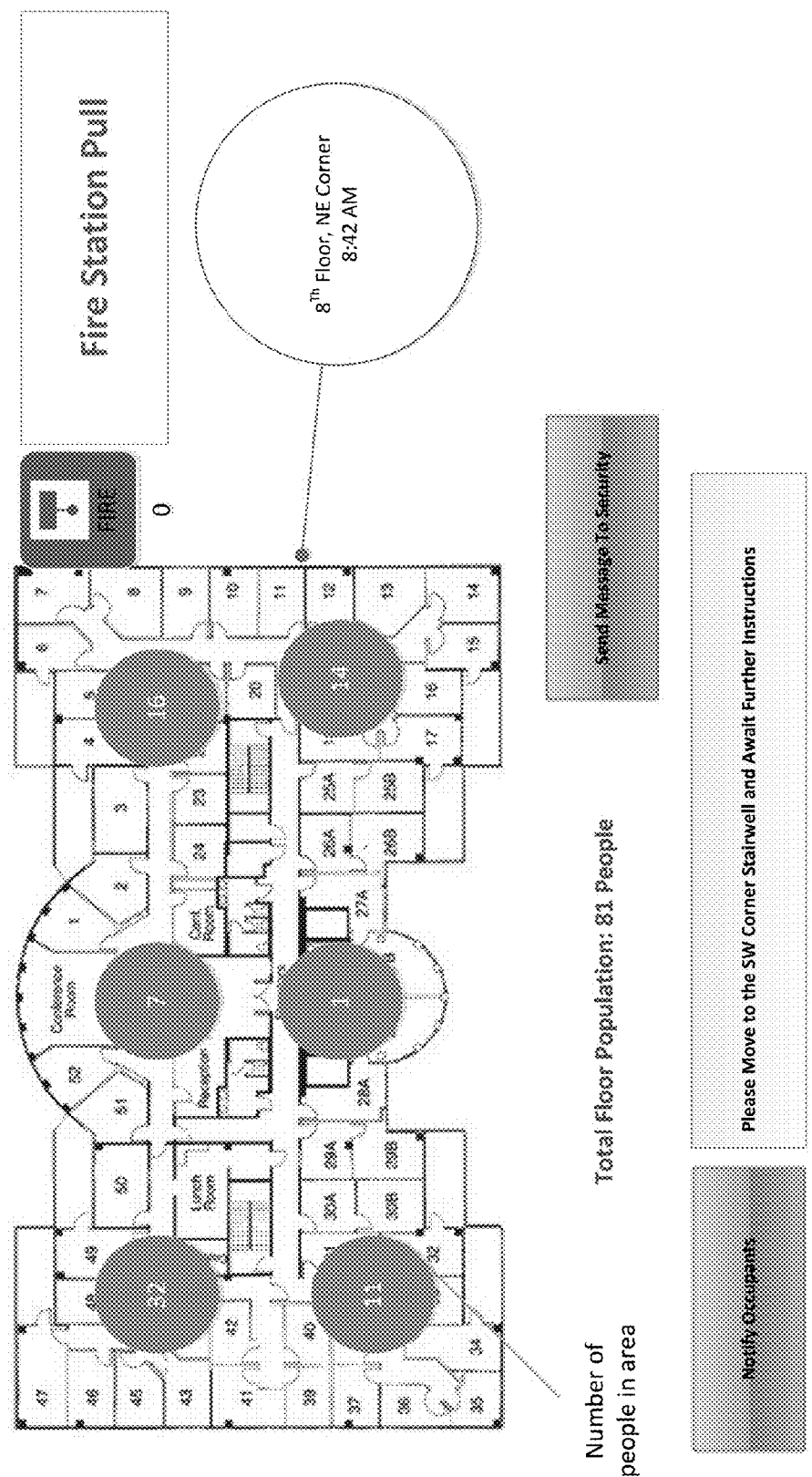
FIG. 16 – EXAMPLE BLOCK DIAGRAM OF BEHAVIOR DETECTION AND ENFORCEMENT

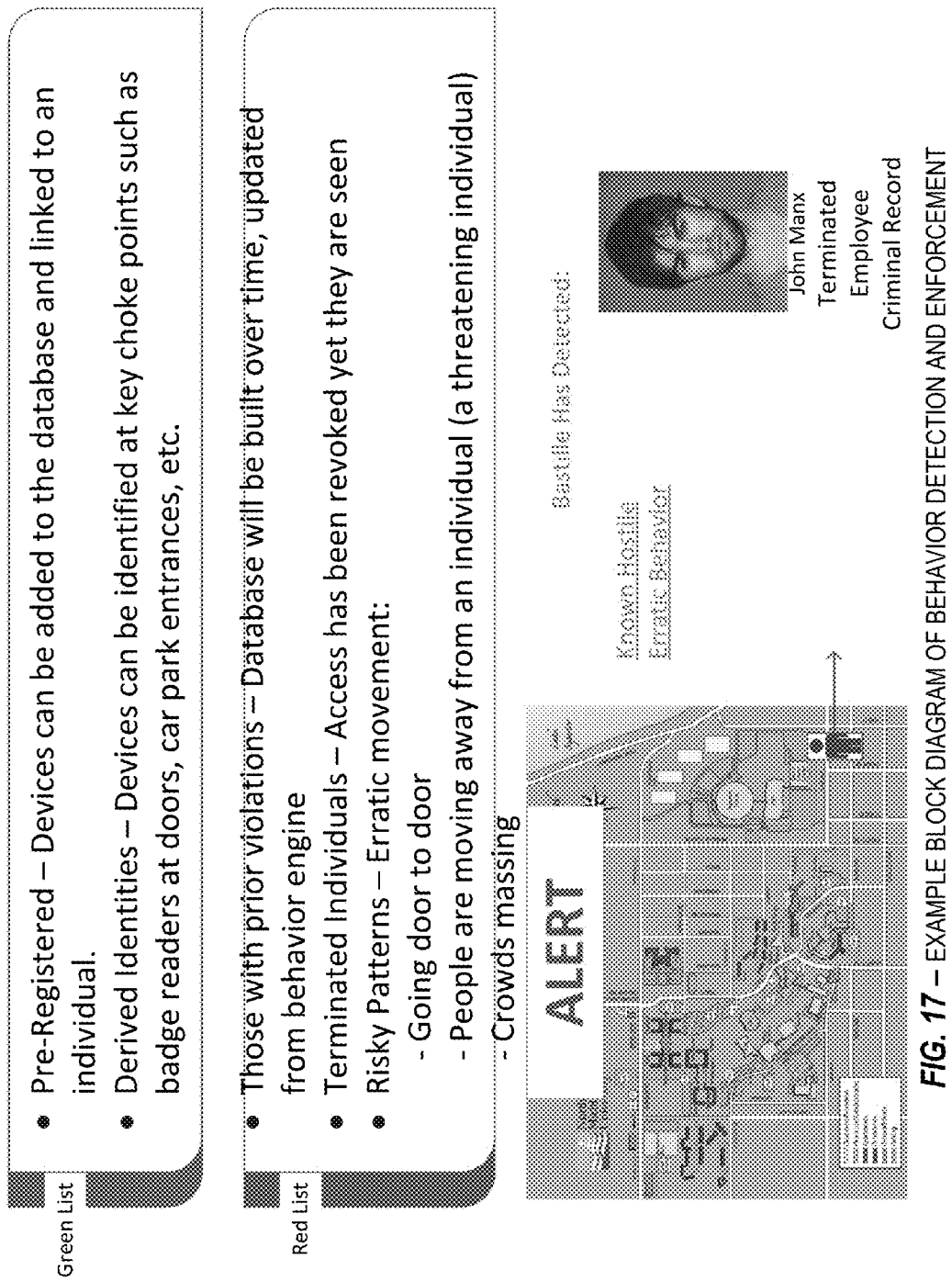
FIG. 17 – EXAMPLE BLOCK DIAGRAM OF BEHAVIOR DETECTION AND ENFORCEMENT

Flexible, Low-Cost Deployment

Coverage of large areas is done with plug-and-play sensors. Transmit via an existing network or cell/sat

Efficient Sensor Architecture

- Low Cost
- Fault Tolerant – Overlapping Coverage
- Multiple Power Options (low voltage, line voltage, battery, solar)
- No "Home Run" wiring
- Independent, Secure Mesh Network

Intelligent Controller

- Tamper Detection
- Multiple Networking Options (WiFi, Ethernet, Cellular, Satellite)
- Low Controller to Sensor Ratio for easy deployment
- Utilizes IT-accepted components and software

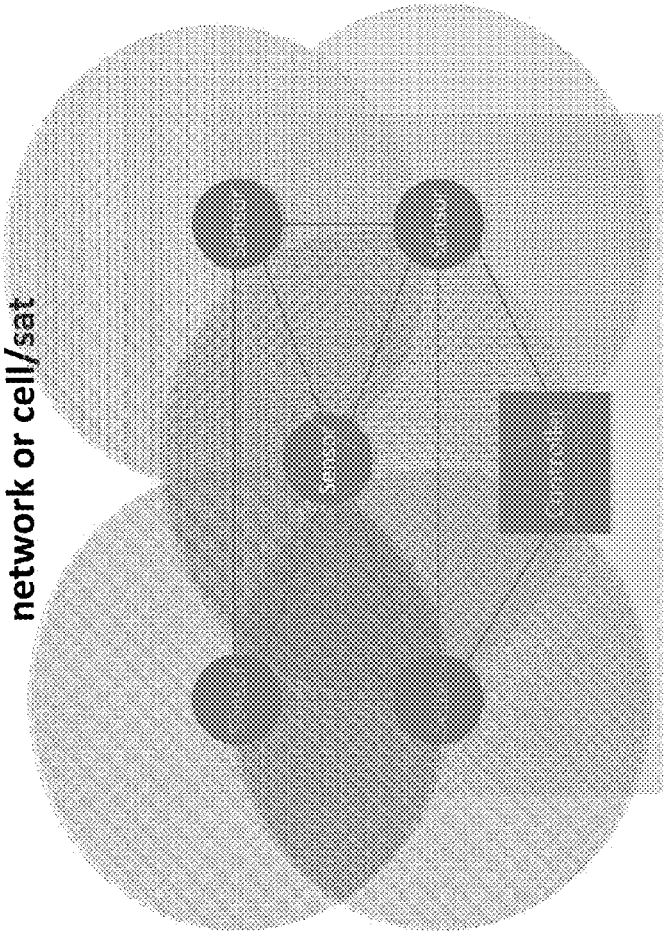

*FIG. 18* – EXAMPLE BLOCK DIAGRAM OF RF SENSOR NETWORK DEPLOYMENT

ANOMALOUS BEHAVIOR DETECTION USING RADIO FREQUENCY FINGERPRINTS AND ACCESS CREDENTIALS

CROSS-REFERENCE TO RELATED APPLICATION(S)

This application claims the benefit of U.S. Provisional Application No. 62/006,605, filed Jun. 2, 2014.

TECHNICAL FIELD

The present disclosure pertains generally to security measures, and more particularly, to the use of detected electromagnetic (EM)/radio frequency (RF) emission signature-based personas for security.

BACKGROUND

There are billions of electronically communicating devices in use in 2013. Many of these devices are wireless devices such as smartphones, tablets, personal computers (PCs), media players and readers, personal digital assistants (PDAs), headsets, cameras, vehicles, wearable fitness and health monitoring devices, and others. Many of these devices use some form of electromagnetic (EM) or radio frequency (RF) technology for communications with other devices, with communication systems provided by wireless service providers and other businesses that provide data communications services, and ultimately with the Internet. Many of these devices are connected to the Internet by wireless communications, forming the growing "Internet of Things" (IoT). With some 9 billion wireless devices in use today, this number is expected to multiply due to business and consumer demands.

Many individuals now carry one or more of these devices everywhere they go. For example, in the United States and other modern societies, it is common for a person to carry a smartphone, a tablet, a wearable fitness device, and a wireless headset as they go about their business, attend school, and attend to their home lives. These devices have become like an adjunct appendage to a person's physical self. Such devices are often the first thing taken by a person when leaving home, school, or the office. Many people feel a sense of disconnection or detachment if one of their devices malfunctions, is lost or stolen, or is forgotten.

An individual's overall persona is uniquely associated with a particular individual. Conventional personal characteristics such as name, height, weight, hair color, are often used, together with other information, to authenticate individuals for purposes of financial transactions, electronic access to systems, and physical access to facilities such as offices, schools, buildings, etc. Three-factor authentication typically uses information representing (1) what you are (personal identifying characteristics such as eye color, facial hair, weight, etc.), (2) what you have (an access card, a specific smartphone, a key, etc.), and (3) what you know (a personal identifying number (PIN), a Social Security Number (SSN), a secret password, etc.).

Because electronic personas are becoming ubiquitous, they can be used to assist in authentication, building security, policy enforcement, and other applications that require awareness of individuals, their locations, their safety, their access rights, and the like. The present disclosure provides a novel approach to using electronic personas for safely and privately executing various purposes.

For example, modern businesses, government, and educational institutions invariably have security and information technology (IT) departments that handle physical and electronic security to facilities, assets, and systems. These security departments often do not have clear visibility into their most important assets—their people. Despite the presence of video and physical security systems, when an incident occurs, security personnel are often forced to sift through aged access control data and must use manual processes to locate personnel and assist them. The data from a morning session of access card "swipe in" data is of little help without an egress monitor, as people come and go during the day, or move around in a facility.

Similarly, certain institutions such as investment banks with separated groups of research analysts and investment bankers sometimes impose "ethical barriers" or access and presence rules within the institution to ensure compliance with internal policies and procedures, as well as compliance with legal regulations and laws. Ethical barriers are hard to enforce using existing access control systems, since there may be no physical barriers within the institution with separate (and expensive) internal access control. Existing access control systems do not readily allow for internal identification of the whereabouts of particular individuals within an organization's facilities, or prevent behavior such as "piggy-backing" of an unauthorized individual into a controlled facility with an authorized individual, whether innocently or nefariously.

Furthermore, institutions typically have a need to know where their people are in time of a crisis or emergency. Buildings and facilities typically issue an evacuation alarm in the event of a fire, earthquake, weather event, criminal act, activist disruption or vandalism, or terrorist activity. While remote video monitoring is the predominant means of evacuation measures, video monitoring does not allow for accounting of particular individuals, or determination that particular individuals have may not have evacuated or may be in distress from the event or from a medical emergency.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment.

FIG. 1 is a block diagram of an exemplary EM persona detection environment, according to example embodiments of the present disclosure.

FIG. 2A is a block diagram of an exemplary sensor network architecture, according to example embodiments of the present disclosure.

FIG. 2B a block diagram of an exemplary RF fingerprint data schema, according to example embodiments of the present disclosure.

FIG. 3 is a block diagram of an exemplary RF sensor architecture, according to example embodiments of the present disclosure.

FIG. 4A is a block diagram of an exemplary EM persona engine architecture, according to one embodiment of the present disclosure.

FIG. 4B is a block diagram of an exemplary EM persona data schema, according to example embodiments of the present disclosure.

FIG. 5A is a block diagram of an exemplary super persona engine architecture, according to example embodiments of the present disclosure.

FIG. 5B is a block diagram of an exemplary super persona data schema, according to example embodiments of the present disclosure.

FIG. 6 is a block diagram of an exemplary behavioral engine, according to example embodiments of the present disclosure.

FIG. 7 is a block diagram of an exemplary campus persona detection scenario, according to example embodiments of the present disclosure.

FIG. 8 is a block diagram of an exemplary RF persona detection system architecture, according to example embodiments of the present disclosure.

FIG. 9 is a block diagram of an exemplary persona behavior detection scenario, according to example embodiments of the present disclosure.

FIG. 10 is a block diagram of an exemplary building lobby RF persona identification environment, according to example embodiments of the present disclosure.

FIG. 11 is a block diagram of an exemplary RF persona creation via building ingress, according to example embodiments of the present disclosure.

FIG. 12 is an example block diagram of visitor RF persona creation, according to example embodiments of the present disclosure.

FIG. 13 is an example block diagram of behavior detection and enforcement, according to example embodiments of the present disclosure.

FIG. 14 is an example block diagram of behavior detection and enforcement, according to example embodiments of the present disclosure.

FIG. 15 is an example block diagram of behavior detection and enforcement, according to example embodiments of the present disclosure.

FIG. 16 is an example block diagram of behavior detection and enforcement, according to example embodiments of the present disclosure.

FIG. 17 is an example block diagram of behavior detection and enforcement, according to example embodiments of the present disclosure.

FIG. 18 is an example block diagram of RF sensor network deployment, according to example embodiments of the present disclosure.

DETAILED DESCRIPTION

The following descriptions of terms used in this disclosure is provided as an aid to understanding the subject matter and terminology of aspects of the present systems and methods, is merely illustrative in nature, and is not intended to limit the scope of the disclosure. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Entity or Persona Entity: an individual, vehicle, place, or asset (in the IoT) that possesses one or more devices that generate an electromagnetic signature, fixed or mobile. For example, a campus or secure facility may have a variety of fixed or mobile EM-emitting assets such as vehicles, stationary WiFi nodes, Zigbee devices, wireless security devices, communications antennas, etc. Any entity that is associated with one or more EM-emitting devices may have a unique fixed or dynamic persona.

Digital Persona: another term for an EM Persona or a Super Persona.

Electromagnetic (EM) Spectrum Fingerprint—A unique signature coming from a particular radio or antenna in a device. Examples of such fingerprints include, but are not limited to Bluetooth signals, WiFi signals, cellular signal, passive or active RFID signal, AM/FM signal, etc., and any identifying information.

Persona, a/k/a Electromagnetic (EM) Persona: a data entity representing an Entity and any EM/RF emitting devices associated with that entity. Typically, one or more electromagnetic spectrum Fingerprints of a device. An example would be multiple radios (Bluetooth, WiFi, Cellular 2G, 3G, 4G, LTE, NFC) in a smart phone determine its EM Persona.

Super-Persona—The linkage of one or more EM personas to a single entity. The entity may be known or unknown. When known, the entity will be linked to other sources of data such as a private database (e.g. Building Access Control) or a public database (e.g. Known Offenders). An example of a super-persona may be a mapping of a particular EM persona to a corresponding respective individual.

Persona Engine a/k/a EM Persona Engine—a computer-implemented system and software that processes signals from EM-emitting electronic devices and allows the grouping of EM fingerprints to form an EM persona. This may be done by observing fingerprints over time or grouping by manufacturer, software version, firmware version, etc.

Behavioral Signatures—Signature Algorithms that define events that occur for electromagnetic spectrum fingerprints or electromagnetic spectrum persona. Examples of such behavioral signatures include, but are not limited to loitering—being in one place for too long, casing—observed multiple times, erratic movement—abnormal patterns in movement by one or more electromagnetic spectrum persona, tailgating—observation of multiple persona in a secure area but only one authentication occurs, comingling—two or more persona observed in relative proximity, credential sharing, etc.

Behavioral Engine: The application of signatures to create rules in connection with predefining the characteristics associated with identifying various behaviors for the purpose of enforcing policy.

Detection Episode: a set of data items representing the detection of one or more EM Personas, associated with a Super-Persona, over a period of time, typically beginning with the appearance of an EM persona, followed by a number of EM transmission incidents, and typically concluded by a terminating event such as detection of egress of the EM Persona from an area under surveillance (AUS), powering-down of the electronic device of the EM Persona, absence of an EM Transmission Incident for a predetermined period of time, or other similar terminating type event.

EM Transmission Incident: an event corresponding to a transmission by an electronic device as it communicates in accordance with its intended functional purpose, e.g., without limitation, a phone call, a text message, an Internet browser data communication, a cellular tower paging communication, a base station service request, etc.

Filtered Fingerprint Feed: filtered or demodulated data that is sent to the controller from one or more spatially distributed sensors, which typically comprises key aspects of data associated with an RF Fingerprint such as a hardware address, telemetry information (timing and position information), device type information, a radio type identifier, etc.

Overview

In accordance with example embodiments of the disclosure, wirelessly-communicating devices, which are often turned on and transmitting and/or receiving RF signals, can be viewed as forming a part of the identifying characteristics of the internet of things (IoT), much like a biometric feature such as fingerprints, an iris in the eye, height, facial hair, weight, etc. Such identifying characteristics may be referred to as a "persona." In accordance with example embodiments, electronic devices may now be considered to form part of an individual's distinct persona. In other words, a person with EM-emitting devices (e.g., smartphones, wearable devices, tablet computing devices, etc.) may have an electronic persona, as well as a physical persona. Collectively, physical as well as electronic characteristics make up a person's overall persona. An electronic persona can form a part of the first two authentication factors—what you are, in the sense of RF emissions coming from your electronic devices, and what you have, in these sense of having those devices in your physical possession and operating them. In example embodiments of the disclosure, electronic persona may be detected and used for identifying internal movement and presence awareness.

In further example embodiments, institutions (e.g., a business entity) may wish to monitor activity within a facility or on a premises (e.g., an AUS), to assess whether the activity is considered expected and normal, for the individuals in that area, or whether an unusual behavior is seen using an EM persona and/or super-persona associated with one or more EM spectrum fingerprint(s). For example, an observed behavior of multiple individuals converging at twice than normal walking speed towards a particular location can be indicative of an emergency or an undesired event unfolding. If the individuals converging are detected as in an unauthorized area, or are unidentified, there may all the more reason for alarm.

In some example embodiments, aspects of the present disclosure may generally relate to systems and methods for assessing, identifying, and protecting personas derived from electromagnetic signatures of the internet of things (IoT). Because many people have multiple mobile communicating electronic devices that they may carry with them, many of which have electromagnetic (EM) signatures (e.g. RF, passive and active radio frequency identification (RFID), etc.), these EM signatures may be uniquely associated with a particular person or a particular group of people, and used for various purposes such as authentication, identification, movement detection, behaviors over time, security notifications, safety awareness, policy enforcement/compliance detection, etc.

In example embodiments, a system for detection and identification of EM personas may include an electromagnetic (EM) sensor network for receiving emitted EM signals from one or more mobile electronic devices carried by individual within an area under surveillance (AUS). The EM sensor network may receive emitted EM signals from the one or more mobile electronic devices and may determine RF fingerprints comprising EM signals from the various devices. The EM sensor network may be configured to provide the determined RF fingerprints to an EM persona engine. In example embodiments, the EM sensors of the EM sensor network may be spatially distributed within the AUS. The EM sensors, in example embodiments, may include any suitable RF scanning device configured to detect EM signatures over one or more spectral ranges dedicated to particular wireless protocols (e.g., WiFi, Bluetooth (BT), etc.). In example embodiments, one or more of the EM sensors of the EM sensor network may include a software defined radio (SDR) configured to be programmable to sample RF signals in one or more RF spectral ranges associated with particular wireless protocols to detect transmission in those spectral ranges.

The EM persona engine may be responsive to an emitted EM signal for associating the signal with a particular type of electronic device, and extracting information from the EM signal to derive any suitable information therefrom, such as, for example, device-type identification data and/or device-specific identification data that is uniquely associated with a particular electronic device. According to further example embodiments, the EM persona engine may also receive and associate time signals with a particular electronic device that indicate a time of detection of the electronic device and/or a detection interval associated with the electronic device. The EM persona engine may further identify a location signal corresponding to a detected location of an electronic device and/or a series of locations of the electronic device detected during a detection interval. The EM persona engine may be operative to generate and store data corresponding to an EM persona, which may include the device type identification data, the device-specific identification data, and entity identifying data. The entity identifying data may include information associated with a particular entity associated with the specific device.

The system may further include a super-persona engine coupled to the EM persona engine for associating one or more EM personas with supplemental identifying information, where the supplemental identifying information may include additional data associated with a particular entity determined as possessing one or more electronic devices in operation in the AUS. The super-persona engine may be operative to generate and store data corresponding to a super-persona comprising one or more EM personas, supplemental identifying information, expected behavior data, and a super-persona activity log.

The system may further comprise a behavior detection engine coupled to the super-persona engine and, in some cases, to the EM persona engine, for processing data corresponding to a detected EM persona and an associated super-persona, to determine a behavior associated with the entity associated with the super-persona, or in some cases, the EM persona directly. The behavior detection engine may be operative to generate data indicative of behavior identified as normal for a particular super-persona during a detection interval or behavior identified as unexpected for the particular super-persona. The behavior detection engine may also be operative to provide a detection output indicating one or more of the following: (a) an expected behavior for an EM persona and/or super-persona; (b) an unexpected behavior for an EM persona and/or super-persona; (c) presence of an unknown EM persona, or (d) a compliance alert upon the detection of particular predetermined event.

The systems and methods, as disclosed herein, may provide novel capabilities that utilize electromagnetic (EM)/radio frequency (RF) emissions from commonly-carried electronic devices to generate an electronic persona and supplement existing security and/or facilities detection and access systems, to provide new approaches for security, safety, and operational/policy/legal compliance.

According to example embodiments, there is disclosed a system and methods that may involve a plurality of distributed EM sensors that are communicatively coupled to any one or more of the EM persona engine, the super-persona engine, and/or the behavior detection engine. In example embodiments, the EM sensors of the EM sensor network, as spatially distributed throughout the AUS may be communicatively coupled to the EM persona engine via a secure communicative link, such as an encrypted channel, a dedicated channel, and/or a secure back channel. In some example embodiments, the EM sensors may be communicatively coupled in a mesh network with each other that may communicate via a secure back channel, with minimized invasive physical wiring, enabling passive, noninvasive detection of EM fingerprints with a deployment within the AUS that may be relatively easy within existing IT and physical security systems. Such a system and its associated processes/methods can readily be converged or otherwise combined with other security and safety infrastructure, to provide improved and enhanced security and safety awareness capabilities. Inasmuch as security professionals often define convergence as the integration of logical security, information security, physical and personnel security, business continuity, disaster recovery, and safety risk management, aspects of the present disclosure will be appreciated as assisting in such convergence.

According to one aspect, the distributed EM sensors may be licensed based on location based on GPS, mobile phone cell towers, Wi-Fi distribution mechanisms, and/or any other RF telemetry. The distributed EM sensors, in example embodiments, may be locked to a location and will discontinue working if moved from a registered/authorized location to ensure socially responsible and licensed use.

According to further example embodiments, a system and processes as described herein may be readily combined and coordinated with existing security systems, such as access control gateways where authorized personnel "badge in" to a facility with an ID card or other access control device (e.g., RFID badge, etc.). Information from such access control systems may be combined with information from the described EM persona detection system to provide for more robust and/or accurate detection and awareness capability. Additionally, in example embodiments, the concurrent detection of an unknown RF fingerprint along with a known access control event may enable the EM persona engine to associate the unknown EM fingerprint with an individual associated with the known access control event.

According to still further example embodiments, systems and methods, as described herein, may provide for supplemented security for secure area access and entity awareness. For example, in a facility utilizing access control gateways (e.g., RFID based access control), authorized personnel present their company badge (e.g., RFID or other access control device) at turnstiles of an access control gateway. Information derived from the access control device may be captured, e.g. at the time of swipe. A timestamp of the swipe or access may also be captured. Timestamps of detection of EM personas may also be captured at the time of access, and throughout the facility as the person moves about carrying the electronic device emitting a detected RF fingerprint. Timestamps may be matched over time to match badge numbers to mobile devices. A super-persona comprising the identity of the individual, his or her associated electronic devices each having one or more RF fingerprints/EM personas, timestamps, and other information, may be persisted for the individual during a detection session. The individual can then be further authenticated for other purposes, using the combination EM persona, super-persona, and access control/badge information.

According to another example embodiment, the departure or exit of an individual associated with one or more EM personas, having a super-persona, may be determined based upon the detection of the individual's electronic devices at the access control gate. In example embodiments, it may be possible to determine if an individual is exiting an AUS from his/her access control and if he/she is purposely or inadvertently leaving his/her electronic device in the AUS.

According to additional embodiments, the system and methods, as described herein, may provide for controlling and detecting for enterprise "ethical" barrier violations or general compliance with entity (e.g., corporate) rules, policy, and/or best practices. For example, an enterprise such as an investment bank may have a policy that personnel who work in certain fields (e.g. equities research) should not be allowed access to personnel who work in other fields (e.g. investment banking) The system may allow detection of persons in controlled or monitored areas (e.g., AUS), based at least in part on their EM fingerprint. It may further be determined if that individual is in a particular AUS in violation of company policy (e.g., an investment banker is in an equities research space at an investment bank).

According to another example embodiment, the systems and methods as disclosed herein, may be configured to detect a terminated employee on (or returned to) the premises (e.g., AUS). In other words, the system may be configured to detect a known, unauthorized visitor, who may have previously been authorized in a particular AUS. Furthermore, the systems and methods, according to example embodiments, may be configured to detect a known and authorized individual (e.g., identifiable by his/her EM fingerprints), but found in an unauthorized area without accompaniment of an approved escort. In additional example embodiments, instances of tailgating, where a visitor or intruder closely follows an authorized person in an attempt to enter an unauthorized area and evade detection, may be detected by the systems and methods as disclosed herein.

According to an example embodiment, erratic behavior detection, such as detection that a number of personnel, whether authorized or unauthorized, are moving at an unexpected (typically high) rate of speed, and/or are converging towards a particular location, may be detected. This type of detected movement may be indicative of a medical emergency or other disaster or emergency. In still further example embodiments, detection of the same persona, such as a particular individual, a plurality of times in a particular area (e.g. each day around the same time, in the same area), may be identified by the behavioral engine in conjunction with one or more of the other engines. This type of casing behavior may be deemed suspicious and may be indicative of nefarious activities and/or intent. Such casing activity may prompt further gathering of information and/or monitoring data. According to another example embodiment, systems and methods disclosed herein may be configured to cooperate with one or more other systems (e.g., RFID access systems) to enforce access to unauthorized areas. For example, if a particular authorized individual is identified as being physically detected at a particular unauthorized location in a facility and/or logging-in or accessing via remote access/Virtual Private Network (VPN) unauthorized systems, security may be notified in real time or near real time. This type of behavior detection, such as by the behavioral engine may, in some cases, suggest possible unauthorized use due to stolen access credentials and/or a stolen RFID card.

According to further example embodiments, EM environment identification within a particular AUS may provide an indication of a normal EM environment, with WiFi nodes, certain known personas, and their devices, moving in and out as normally expected within expected bounds, such as bounds defined by probability measures established over time of observing the particular AUS. In this environment, a detection of an unknown EM signature from an unknown device may suggest the presence of a bugging device or other unauthorized electronic device.

According to yet further example embodiments, authentication for transactions (e.g., Automated Teller Machine (ATM) transactions) may be performed by coupling the EM persona detection with other authentication mechanisms, such as for ATM transactions. This may impose additional security awareness or procedures in the event of use of credentials for ATM access with a different EM persona than an EM persona associated with known ATM account holder.

According to further example embodiments, in the event of a crisis or emergency, such as in the event of a fire alarm or other emergency, identifying RF personas in the area of the emergency may provide an indication of whether evacuation is proceeding apace, whether bottlenecks or blocked egress points are present, and/or whether a person (or device) has been left behind or separated from the individual.

According to example embodiments, a system and method, as described herein, may provide an augmented reality type informational display of personas, known and unknown, based on detected EM personas, especially in the case of unknown individuals, individuals whose behavior has been identified as erratic, or individuals who are known to be "bad" or "risky" or otherwise undesirable on the premises, such as discharged employees. Such persons can be on a "black list" of persons who receive special security attention or scrutiny. Security personnel may be provided with an augmented reality device such as Google® Glass or Oculus® Rift, with an overlay providing information of the identity of a person within a field of view of the personnel. For example, the information may flag a person as a known employee, unknown person, a person on a black list, etc. These and other aspects, features, and benefits of the disclosure will become apparent from the following detailed written description of example embodiments and aspects taken in conjunction with the following drawings, although variations and modifications thereto may be effected without departing from the spirit and scope of the novel concepts of the disclosure.

For the purpose of promoting an understanding of the principles of the present disclosure, reference will now be made to the example embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein, are contemplated as would normally occur to one skilled in the art to which the disclosure relates. Any limitations of scope should be determined in accordance with and as expressed in the claims.

Overall System Architecture

Referring now to the drawing figures, in which like numerals and other identifiers represent like elements, components, and/or processes, FIG. 1 illustrates an environment in which an EM persona detection system 100 is deployed to receive EM signals, e.g. RF signals, from one or more mobile devices 10, such as a smartphone 10a, a cellphone 10b, a tablet 10c, a laptop 10d, an active or passive RFID device 10e such as an access card, or a wireless Bluetooth peripheral device 10f such as wireless headset or personal fitness device, hereinafter referred to individually or collectively as device(s) 10. Those skilled in the art will understand and appreciate that each of these devices 10 may contain one or more radio frequency (RF) radios or transceivers that emit EM energy at a particular frequency, or band of frequencies, with signals in a particular protocol. For example, known EM communication protocols, at least as of the filing date of this application, include but are not limited to cellular voice communications in 2G/3G/4G/LTE formats, WiFi (IEEE 802.11x, where "x" varies as to a standardized configuration identifier), direct WiFi, Bluetooth, Zigbee, active and passive RF, combinations thereof, and the like.

Aside from the fact that some devices may include several different radios, any of which can transmit, depending on external factors, an individual may have one or more of such devices in their possession at any given time. Furthermore, the radios in such devices may transmit (or receive) data at various times, depending on external factors, and some radios may be disabled or malfunctioning or turned off.

The EM persona detection system 100 may be operative, as described herein, to carry out various computer-implemented methods for detecting the RF emissions of a number of such devices 10, and associating those emissions with certain entities 20 (such as people 20a, assets 20b, vehicles 20c, places 20d, etc.), creating and maintaining sets of data corresponding to the radio emissions and the associated entities 20, storing data from the detecting operations, processing the data to determine whether certain behaviors of the entities 20 are present, and, in certain cases, providing alerts or alarms that certain behaviors of known entities 20 are expected, unexpected, erratic, or associated with unknown or known "bad" entities or persons. Thus, entities 20 may be known entities, as shown in FIG. 1, or unknown entities such as that shown at 20f Entities, once identified, may have an EM persona, as described herein, and may become "known" entities. Known entities may be associated with particular expected behaviors that are reprogrammed or observed and/or determined by checking over a period of time. Unknown entities are monitored until they are either determined as known or until action is taken as a result of a system policy determination. Further still, known entities may be determined as being authorized or authenticated, or may alternatively be indicated as "bad" or "suspicious", warranting continued and perhaps enhanced detection, and triggering alerts. It will be appreciated that, in example embodiments, there may be various tiers of alerts. In other words, the gravity, or at least the perceived gravity, of various events that trigger an alert may vary. For example, the presence in an AUS of an ex-employee who has been released for cause, is known to have mental health issues, and is known to own a firearm may be greater level alert event than a new employee inadvertently walking into a restricted AUS. According to example embodiments, there may be any suitable number of tiers of warnings and the number of tiers may be configurable by the users of the system 100.

The system 100 may include various electronic and computer-implemented components or elements that permit the various operational capabilities of the system. In particular, and as shown generally in FIG. 1, the system 100 may include a sensor network 110, an EM persona engine 120, a super-persona engine 130, and a behavioral engine 140. Details of these components or subsystems are described in greater detail below.

The sensor network 110 may include one or more RF/EM antenna(s) 112 coupled to an RF controller 115. The antennas 112 are mounted in an area under surveillance (AUS), such as in a distributed fashion, to receive EM emissions from devices that enter the AUS and that are actively transmitting, either continuously or intermittently. In example embodiments, the antenna(s) 112 may be spatially distributed in a fashion such that at least one of the antenna(s) 112 is positioned to detect an RF signal emitted by a user device 10 within any location of the AUS. The antenna(s) 112 may be coupled in various physical configurations to each other, such as via a wireless mesh network, or individually, to the RF controller 115. Furthermore, each antenna 112 in the sensor network 110 may be associated with location information, which assists the system 100 in determining the location of various devices 10 in the AUS. The location information may be provided in various forms, including, for example, by inclusion of global positioning satellite (GPS) receivers associated with an antenna 112 or with the RF controller 115 to provide geospatial data, or by preloading fixed location information into an electronic device or memory associated with the antenna 112 or RF controller 115. Further details of the antenna 112 configuration are provided below.

The antenna(s) 112 may be configured for receiving radio frequency signals from one or more devices 10 associated with various entities 20 within the AUS. The communications antenna 112 may be any suitable type of antenna corresponding to the communications protocols used by the user device 110. Some non-limiting examples of suitable communications antennas 112 include Wi-Fi antennas, IEEE 802.11 family of standards compatible antennas, Wi-Fi Direct antennas, Bluetooth antennas, 2G/3G/4G/LTE format antennas, Zigbee antennas, dedicated short-range communication (DSRC) antennas, or other packetized radio communications antennas, directional antennas, non-directional antennas, dipole antennas, folded dipole antennas, patch antennas, multiple-input multiple-output (MIMO) antennas, phased-array antennas, or the like. In example embodiments, each of the antenna(s) 112 may represent more than one antenna in relative proximity to each other. This may be because a single antenna 112 may not have sufficient bandwidth and/or it may not be possible to tune the resonance frequency of a single antenna 112 to receive RF signals from each of the RF bands to be monitored with sufficient efficiency. For example, an antenna 112 that may be configured to receive RF signals at or near 850 MHz (2G/3G cellular bands) may not be configured to receive RF signals at 60 GHZ channels (e.g. 802.11ad). In this case, the antenna 112 may represent more than one physical antenna 112 to span the full range of frequency bands to be monitored by the system 112.

In accordance with an aspect of the disclosure, the RF controller 115 may be a computer-implemented software-defined radio (SDR) that may be remotely configured to detect new and added communication frequencies and protocols. The SDR-based RF controller 115 may be operative, as will be described, to extract identifying information from the EM emissions it detects within the AUS. In other words, the SDR-based RF controller 115 may be configured to sample frequency bands associated with a variety of communications protocols and upon detecting EM transmissions in one of more of these frequency bands, identify one or more device identifiers from the detected EM transmissions. The RF controller 115 may then associate any determined geospatial information derived from signals from the various coupled antenna(s) 112 or preloaded location information, to generate a data feed shown in FIG. 1 as Filtered Fingerprint Feed. In one aspect, the Filtered Fingerprint Feed is the filtered or demodulated data that is sent to an EM persona engine 120 from the RF controller 115. Typically, the Filtered Fingerprint Feed comprises key aspect data such as relevant signature information, hardware address according to the protocol, and telemetry information (timing and position information). The Filtered Fingerprint Feed may be provided to the EM persona engine 120 for further processing and utilization. It will be appreciated, therefore, that the RF controller 115, along with a spatially distributed set of antennas 112 may operate as RF/EM sensors of the sensor network 110 that are configured to detect any wireless communications protocols being used by any devices 10 within the AUS. Further details of the SDR-based RF controller 115 are provided below.

An SDR may be utilized, in example embodiments, in the RF controller 115 because several frequency bands may be monitored by the system 110 in the AUS ranging in frequency, encoding, and/or modulation mechanism. By using SDR, the various protocols monitored may be efficiently sampled in a progressive fashion using substantially the same hardware (e.g., antennas 112, RF controller 115, etc.) across the various protocols. Additionally, it will be appreciated that as new communications protocols are added, the SDR may be reprogrammed with new or updated software and/or instructions configuring the SDR to sample the RF signals in the new protocols, in accordance with the frequencies, modulation techniques, and encoding associated with the new protocols.

The EM persona engine 120 may be a computer-implemented system that is configured to receive data in the Filtered Fingerprint Feed and associate EM signals with a particular type of electronic device 10a, 10b, 10c, 10d, 10e, 10f by extracting information from the EM signal to derive (a) device-type identification data and (b) device-specific identification data that is uniquely associated with a particular electronic device. In one aspect, the device-type identification data and the device-specific identification data form a part of the electronic persona associated with a particular entity, once the data is associated with that entity by processes described herein. In addition, the EM persona engine 120 may provide (or utilize if included in the Filtered Fingerprint Feed), time signals associated with a time of detection of a particular electronic device 10 in the AUS and/or a detection interval during which the particular electronic device 10 is detected. Further, the EM persona engine 120 may provide (or utilize if included in the Filtered Fingerprint Feed) geospatial location information or other location signals corresponding to a detected location within the AUS or a series of operations during a detection interval or detection episode associated with a particular electronic device 10.

The EM persona engine 120 may use one or more of data items including, but not necessarily limited to, (a) device-type identification data, (b) device-specific identification data, (c) time signals, and (d) location signals to form a set of data identified generally herein as an "EM persona." This EM persona may include a single data item that primarily represents the detection of a particular EM-emitting device at a particular point in time or may include a more complex data item or items representing a series of detections of a particular device 10 as it is initially detected, emits signals via its various radios, moves within the AUS, transmits continuously or intermittently, and eventually leaves the AUS or is powered-off while still within the AUS. In all cases, the data representing the electronic device 10 and its emissions, including time and location information, form part of a static or dynamically changing EM persona.

Still referring to FIG. 1, the primary output of the EM persona engine 120, as described above, may be a data set constituting an EM persona. This EM persona data set, hereinafter referred to just as an EM persona, may be provided to a super-persona engine 130 as a stream of EM persona data items, in a format or data schema as shown (for example) in FIG. 4B. The super-persona engine 130 may be a computer-implemented system that receives a data feed of a plurality of EM persona data items from the EM persona engine 120 and associates one or more EM personas with supplemental identifying information for the purpose of creating a higher level data entity known as a super-persona. In particular, it will be understood that any given entity (e.g. a person) may possess one or more EM-emitting electronic devices 10, and that the entity may have one or more of these devices 10 on their person at any given time or in any given place, and that such devices 10 may or may not be emitting EM signals while in the AUS. Thus, the super-persona engine 130 may be operative to associate these one or more devices 10 with a particular entity (person, asset, vehicle, location, etc.), and generate data sets corresponding to one or more detection episodes for an EM persona.

In example embodiments, the super-persona engine 130 is operative to associate one or more EM personas with supplemental identifying information for purposes of generating and storing a set of data items corresponding to a super-persona. The supplemental identifying information typically comprises additional data associated with a particular entity determined as possessing one or more electronic devices 10 in operation in the AUS, as well as other information. For example, a super-persona data set may comprise data items representing the entity's name, the types of electronic devices 10 detected as being present with the entity, the identifiers associated with the EM emitting radios of the devices 10, last seen configuration data, current configuration data, etc. This super-persona data set, hereinafter referred to just as a super-persona, may be provided to a behavioral engine 140 as a stream of super-persona data items, in a format or data schema as shown (for example) in FIG. 5B.

In accordance with one aspect of the system 100, the super-persona engine 130 may further be operative to determine further supplemental identifying information corresponding to a super-persona, for example a super persona may correspond to (1) a known or previously seen entity that is expected, authenticated, or authorized for certain activity or access or locations, (2) a known or previously detected entity that may not be fully identified, but persistently appearing, (3) a known entity that is identified as unauthorized, not authenticated, undesirable, or on a "black list" of specifically excluded or alarm generating entities 20, or (4) an unknown entity 20f, appearing for the first time within the AUS or intermittently reappearing prior to full identification. The supplemental identifying information can also be supplied by an ancillary identifying information system 134, such as a card-swipe system, an RFID system, a near-field communication (NFC) system, or indeed, any suitable access control system operated at or near the AUS that controls access to the AUS. In particular, a system 100 constructed as described herein may advantageously operate in conjunction with a known area access system to receive identifying information generated upon granting of access to an entity (e.g. an authorized employee) into a controlled area, which can be used to associate that authorized individual's name and incidence of access to the controlled area with the super-persona of that individual. Such an access-granting event, as will be appreciated, may be a triggering event for a detection episode or an interim event during a detection episode in a case, for example, where the entity 20 was detected in a proximate AUS and transits to the access control point. The super-persona engine 130 is therefore further operative to include such supplemental identifying information as a part of the super-persona data items, for use by the behavioral engine 140.

In example embodiments, the super-persona engine 130 may have access to, maintain, and/or generate a look-up table, such as in one or more datastores and/or memories of the super-persona engine 130 where associations between entities and their EM personas may be stored, along with supplementary access system identifiers (e.g., RFID identification).

In some example embodiments, if a black list super-persona and/or an EM persona is identified relatively proximate to an access/ingress/security point, such as an RFID controlled door, the behavioral engine 140, super-persona engine 130, and/or EM persona engine 120 may be configured to provide an indication that the access point is to be shut-down or that there is a potential security threat at the access point and a shut-down should be considered. In some example embodiments, the behavioral engine 140, super-persona engine 130, and/or EM persona engine 120 may be configured to automatically shut-down or direct a shut-down of an access point when a potential threat is detected in relative proximity to that access point.

Still referring to FIG. 1, the behavioral engine 140 may be configured to receive data corresponding to super-personas from the super-persona engine 130, and provide certain detection functions. In particular, the behavioral engine 140 processes data corresponding to one or more detected EM personas and an associated super persona, to determine a behavior associated with the entity associated with the super persona. The behavior detection engine 140 is operative to generate data indicative of behavior identified as normal for a super persona during one or more detection episodes, or behavior identified as unexpected or erratic for a super persona, or behavior associated with any unknown entities. For example, the behavioral engine is operative to identify one or more behavioral signatures associated with an EM persona or with an associated super persona. Examples of such behavioral signatures include, but are not limited to one or more of the following:

normal—an expected pattern of movement, time, and place for an entity, typically developed over a period of time of detection.

loitering—being in one place for too long, e.g. longer than a predetermined time period.

casing—observed multiple times, e.g. remaining unidentified on multiple occasions, in different areas of the AUS, failing to remain activated sufficiently long for correlation with identifying information such as video surveillance, etc.

erratic movement—abnormal patterns in movement by one or more EM personas, e.g. excessive speed, movement toward unauthorized areas on multiple occasions, multiple personas converging at excessive speed, "ganging" of multiple personas, etc.

tailgating—observation of multiple personas in a secure area but only one authentication occurs, by virtue of credential sharing, etc.

unauthorized location—an individual is detected in an unauthorized AUS.

unauthorized comingling—two or more individuals that are not to interact are found to be in relative proximity for periods of time that may indicate violations of comingling protocol.

It will be appreciated at this juncture that a behavioral signature may be determined based at least in part on a single EM persona, prior to creation of a super persona, as in the case of an EM-emitting device 10 appearing for the first time in the system's database, which is heretofore not associated with any particular entity and therefore necessarily associated with a super-persona marked as "unknown," at least temporarily. In example embodiments, an initial detection episode for an unknown persona may typically be given heightened attention by the alarm or alert functions in the system 100, in that newly-appearing EM personas are more likely to be associated with unauthorized or undesirable entities than super-personas who have known EM personas in their possession but happen to have a "new" or upgraded device that has not yet been profiled to create an EM persona for the device and associate that new or upgraded device with the super-persona. The behavioral engine 140 is operative to detect behavioral signatures based on preloaded behavior templates stored in a behavior database, described elsewhere herein. In accordance with an aspect of the disclosure, behavior templates may be predetermined by system administrators or other authorized personnel associated with the operations of the system 100, in both positive (expected, normal, authorized, authenticated) and negative (unexpected, erratic, unauthorized, unauthenticated, "bad", black-listed, unknown) formats. The behavioral engine 140 may be operative to process super-persona data arriving from the super-persona engine 130, and in some cases directly from the EM persona engine 120, to create detection episodes, store data corresponding to the detection episodes, retrieve one or more templates corresponding to positive or negative activity, and provide an output to an awareness console or system 150 for handling the detected behavior of the super-persona and/or EM persona. The monitoring system 150 may be a known security awareness system that utilizes data from the EM persona detection system 100 either alone, or in conjunction with other security or safety detection data such as that from access control systems, video surveillance systems, motion/infrared/vibration (seismic) detection systems, etc., to provide more complete security or safety awareness capability.

According to one aspect, the behavioral engine 140 provides an awareness output indicating one or more of the following: an expected behavior for a super-persona; an unexpected behavior for a super-persona; presence of an unknown EM persona or super-persona, and/or a compliance alert upon the detection of particular predetermined event. According to another aspect, the behavioral engine 140 generates and stores data corresponding to the monitored activity or behavior of a super-persona comprising one or more EM personas, supplemental identifying information, behavior data, and a super-persona activity log. As is known to those skilled in the art, security and safety detection systems typically generate and store activity logs during operations so that relevant personnel can inspect and review prior detection episodes, for various purposes such as developing new positive and negative behavior templates, forensic investigation of safety or security events, compliance (or noncompliance) reporting, training of security and safety personnel, troubleshooting, and the like.

In example embodiments, the behavioral engine 140, based at least in part on received EM persona information, may be configured to identify whether a particular EM persona of an electronic device 10 that is not associated with a super-persona is to be associated with a particular super-persona. In example embodiments, the behavioral engine 140 may make a recommendation to one or more administrators or other authorized personnel pertaining to association of one or more EM personas with a pre-existing super-persona on a datastore that maps EM personas to corresponding super-personas of various entities 20. The behavioral engine 140 may be configured to detect a temporal and/or spatial correlation of an unknown EM persona with a known EM persona and/or other security access mechanism to make a determination that the EM persona may be associated with the other known EM persona and/or security access mechanism via a common super-persona. For example, an unknown EM persona may be detected at substantially the same time as a card access event on a secure card access system. In this case, the behavioral engine 140 may make a recommendation to an administrator, such as via a display on a display device, that indicates that the unknown EM persona, characterized by a detected fingerprint, may be included in the super-persona corresponding to the entity 20 involved in the card access event. In another non-limiting example, the behavioral engine 140 may detect that a device 10 corresponding to a particular unknown EM persona may be moving within a threshold distance of another device 10 with a known EM persona for greater than a threshold period of time and/or a threshold distance within an AUS. Based at least in part on this threshold-based analysis, which may be spatial and/or temporal in nature, it may be determined that the unknown EM persona should possibly be associated with the super-persona corresponding to the known EM persona and/or the access event. As a result, this possible association may be indicated to an authority or administrator of the system 100 or personnel of the AUS. If the association is approved, then the behavioral engine 140 may be configured to update a datastore having a lookup/association table that associates EM persona(s) with corresponding super-persona(s) of various entities 20.

In other example embodiments, the behavioral engine 140 may access and/or receive information related to additional access control systems (e.g., RFID, NFC, key card systems), where an access event may be detected at an ingress point to allow access to an individual. In these cases, an unknown RF signal and its associated RF fingerprint (e.g., hardware address or radio type identifier) may be correlated to a particular super-persona based at least in part on detection of the RF fingerprint at the same or similar times when an individual has entered an AUS as detected by an access event of the access control system.

In some example embodiments, historical data associated with the detected presence of the fingerprint and access control events associated with particular access credentials may be used to analyze whether a particular unknown RF signature (or EM persona) is to be associated with a particular super-persona that is associated with the particular access credentials. In these example embodiments, a score or other metric may be assigned to any given pairing of a particular unknown RF fingerprint and particular access credentials. Each score may be a measure of, for example, a temporal relationship between a particular unknown RF fingerprint and particular access credentials, and thus, a measure of the potential association between the unknown RF fingerprint and the super-persona with which the access credentials are associated.

In certain example embodiments, for any given pairing of a particular unknown RF fingerprint and particular access credentials, the corresponding score associated therewith may be first initialized to zero. Various heuristics may then be applied to increment or decrement the score based on the presence or absence of various conditions. For example, if an unknown RF fingerprint is detected during a particular time period (e.g., on a particular day) and an access control event for the access credentials is not detected during that time period, the score representative of the temporal relationship between the unknown RF fingerprint and the access credentials may be decremented by a first value. Similarly, if an access control event for the access credentials is detected during a particular time period but the unknown RF fingerprint is not detected during that time period, the score may be decremented by a second value. If, on the other hand, both the unknown RF fingerprint and an access control event for the access credentials are not detected during the same time period, the score may be incremented by a third value.

If both the unknown RF fingerprint and an access control event for the access credentials are detected during the same time period, an additional set of heuristics may be applied to determine how the score is to be incremented or decremented. First, all timestamps associated with detection of the unknown RF fingerprint during the time period and all timestamps associated with access control events for the access credentials during the time period may be ordered. A determination may then be made as to whether a timestamp associated with an earliest detection of the unknown RF fingerprint during the time period is within a threshold period of time from a timestamp associated with an earliest detection of an access control event during the time period. If these two timestamps are within the threshold period of time from one another, the score may be incremented by a fourth value. As another example condition, if the timestamp associated with the earliest detection of the unknown RF fingerprint during the time period is before the timestamp associated with the earliest detection of an access control event, the score may be decremented by a fifth value. As yet another example condition that may be evaluated, a difference between a timestamp associated a detected access control event after the initial detected access control event and a corresponding temporally closest unknown RF fingerprint detection may be compared against a threshold period of time. If the difference is within the threshold period of time, the score may be incremented by a sixth value, and if the difference is not within the threshold period of time, the score may be decremented by a seventh value. This condition may be evaluated for each detected access control event subsequent to the initial detected access control event. It should be appreciated that absolute values of any of the first through seventh values may be the same value or different values.

In this way, a respective score may be generated for each pairing of an RF fingerprint with access credentials. If the score associated with a given pairing of an RF fingerprint with access credentials exceeds a threshold score, it may be determined that the RF fingerprint is associated with a user to whom the access credentials have been assigned. As such, the super-persona with which the access credentials are associated may be updated to indicate that the RF signature is associated with the super-persona.

It will be appreciated that in example embodiments, the EM persona engine 120, the super-persona engine 130, and/or the behavioral engine 140 may be part of an integrated system. Indeed, in example embodiments, the processes of each of the engines 120, 130, 140 may be performed on the same computer and/or server. It should further be noted that the EM persona engine 120, the super-persona engine 130, and/or the behavioral engine 140 may be relatively remote (e.g., in the cloud) from the facility that houses the AUS and, therefore, remote from the sensor network 110, antennas 112, and the RF controller(s) 115.

It will further be appreciated that in example embodiments, the EM persona engine 120, the super-persona engine 130, and/or the behavioral engine 140 may be owned/controlled by a different group or organization than the group or organization that owns/controls the AUS. In other words, the organization that controls the AUS may at least partially outsource some of the security monitoring and analysis functions of the AUS to a third party organization that controls the engines 120, 130, 140 and provides security services for securing the AUS. In some cases, the organization that controls the engines 120, 130, 140 may provide security services to multiple clients and, therefore, may be configured to aggregate potential threats across various companies. For example, if a particular person has been identified as a shoplifter at one department store based on his/her EM persona or super-persona, when that person enters another department store, that other department store may be warned that the person may pose a security/theft threat.

In some cases, there may be personal privacy issues involved with aggregating information across organizations. For example some companies may not wish to share details about its employees, such as employee names with a third party security system. In this case, the RF controllers 115 deployed in these organizations may conceal the identity of people under surveillance to the third party organization, while still substantially employing the systems and methods as disclosed herein. In example embodiments, the device identifier detected by the sensor network 110 and the RF controller 115 and/or the EM persona associated therewith may be encrypted, such as by a hash (e.g., one-way hash) prior to transmitting to the EM persona engine 120, super-persona engine 130, and/or behavioral engine 140. Any personas created and maintained by the third party off-site of the organization that is employing the security services may not include the true identity of the entity 20 or the associated device 10, but instead may include one-way hashed versions of that information. When the behavioral engine 140 reports a security alert or potential threat, a hashed version of identifying information may be provided to the security systems at the facility being monitored. Those systems may be configured to use a hash mapping to derive the true identity of any potential security threat based at least in part on the received hash form the remote behavioral engine 140.

Sensor Network Architecture

FIG. 2A is a block diagram illustrating various functions of the sensor network 110 in greater detail, in accordance with example embodiments of the disclosure. In one aspect, the RF sensors 112, e.g. 112a, 112b . . . 112n, are deployed to cover an area under surveillance (AUS) and receive EM emissions (RF signals) emanating from the radios of various devices 10 in the AUS. A plurality of RF sensors 112 is typically deployed in a distributed arrangement to pick up EM signals transmitted by the radios in various mobile devices, regardless of frequency or protocol, within the bands of 15 MHz to 6 GHz. As will be generally understood by one of ordinary skill in the art, the aforementioned bandwidth range are non-limiting examples and that any bandwidth range may be used by the present system and is not intended to limit the spirit or the scope of the present disclosure.

Those skilled in the art will understand that combined antenna/receiver devices are small, low power, self-contained, and draw power from various sources such as a battery, electrical wiring, or a solar, wind, or other suitable power source. In one embodiment, EM signals are captured by the receiver and the signal is demodulated by the SDR of the RF controller 115. Accordingly, the demodulated signal may be transmitted to a controller 115, which aggregates the incoming signals and transmits the demodulated signal data to a server, such as the EM persona engine 120. In another embodiment, the receiver receives EM signals and transmits the modulated signal to a controller, wherein the controller demodulates the signal, aggregates the demodulated signals, and transmits them to the server 120.

In example embodiments, a plurality of RF sensors 112 may be connected in a mesh network arrangement, with each RF sensor 112 being coupled for data communications to at least one, and possible more than one, nearby "partner" RF sensors 112 via a secure RF backhaul channel. Those skilled in the art will understand that a mesh network allows a wider distribution of sensors and, if properly arranged, a redundancy to communication channels, to facilitate the collection of EM signals received within the AUS. Ultimately, each RF sensor 112 is connected for communications to an RF controller 115, which provides certain functions that assist in the determination of an EM persona. For example, the RF controller 115 provides functions including but not limited to: control of connected RF sensors 112, including detection and reporting of malfunctions, updating of software, etc.; consolidation of EM signals received by multiple RF sensors 112 that originate from the same electronic device 10, so that redundancy of reporting is avoided; transmitting/communicating data representing RF fingerprints to the EM persona engine 120; noise reduction, i.e. processing received signals from electronic device 10 to eliminate or reduce noise; tamper detection, i.e. provide commands for testing the operations of connected RF sensors 112, reporting malfunctions, detecting the occurrence of tampering or interference, etc.; signal verification, e.g., processing received signals from electronic devices to ensure that a solid signal is received and that a received signal possesses extractable identifying information.

It will be appreciated that the mesh network of RF sensors 112 may utilize a wireless and/or a hardwired communications medium between each RF sensor 112 to evacuate the indication of detected EM signatures to the RF controller 115 and/or remote server 120. In example embodiments, the communications from one RF sensor to the next RF sensor, to the RF controller 115, and/or to the remote server 120 may be encrypted to prevent any intrusion and/or detection of communications. In these example embodiments, any suitable mechanism for encryption may be utilized for inter-RF sensor communications. It will also be appreciated that in example embodiments, a mesh network configuration may not be utilized and that instead a direct link from each of the RF sensors 112 to the RF controller 115 and/or remote server 120 may be employed.

As mentioned above, the RF controller 115 is preferably a software-defined radio (SDR) receiver, which may be coupled to a plurality of RF sensors 112. An SDR radio receives a plurality of EM signals and may transmit the data within the captured and sampled EM spectra. One or more RF controllers 115 may be deployed in a given EM persona detection system 100. Each RF controller 115 in a system generates data packages identified as RF fingerprints corresponding to the detection of an emission of a radio of a device 10 within the AUS. The RF controller 115 may provide a continuous data feed of RF fingerprint data packages derived from detection of EM emissions from devices 10 within the AUS.

Referring now to FIG. 2B, the data feed of each RF fingerprint comprises a data package or schema having data items that include but are not limited to the following data items: Device type identifier, e.g. iPhone®, iPad®, Samsung Galaxy®, Dell Inspiron®, Motorola, etc.; Device identifier, e.g. MAC address, IMEI, ESN, other mobile ID, etc.; Radio type identifier, e.g. 2G, 3G, 4G, LTE, WiFi, Zigbee, Bluetooth, etc.; Frequency band detected; Modulation scheme, e.g. 802.11x; Location of device, e.g. GPS coordinates detected, triangulated position, etc.; RF Sensor identifier, e.g. which particular RF sensor 110 in a network detected the particular radio or device; Time of detection and type, e.g. initial detection of a device upon ingress to AUS; detection of egress of device; "not seen lately" flag to indicate device made ingress to AUS but not detected for egress, etc.; Strength of the signal captured (e.g., received signal strength indicator (RSSI)). As will be described in greater detail, the RF fingerprint data packages from each RF controller 115 may be provided to the EM persona engine 120, as will be described in more detail in connection with FIG. 4.

FIG. 3 shows certain details of an example RF sensor 112 and RF controller 115. The RF sensor 112 may include two major components: RF scanner hardware 305 and RF scanner software 310. According to an aspect, the RF scanner hardware 305 may be a wideband software-defined radio (SDR) that scans predetermined designated frequencies for signals (such as frequency bands used in certain wireless communications protocols), receives location signals from detected devices (or alternatively is preprogrammed with location information), and that is physically configurable for multiple different types of antennas for signal detection. The RF scanner software 310 provides functions for the SDR in the RF scanner hardware 305 including, but not limited to, maintaining a list of frequencies to scan, brokers data from the RF scanner hardware to a signal analysis server, and maintains a local database of signals detected. In one aspect, the SDR determines the frequency band of particular signal by analyzing the incoming signal, wherein analyzing the signal typically comprises comparing the incoming signal to a predefined list/dictionary of potential modulation schemes. The SDR further matches the incoming signal to a predefined modulation scheme and categorizes the incoming signal by transmission type. In one aspect, if the signal is unidentifiable it is labeled as unidentifiable and the signal modulation type is stored for further matching. It will of course be appreciated that as the unidentified signal goes into queue, it will later be analyzed to determine the unidentified signal's nature, origin, and characteristics.

The example RF controller 115 may include two major components: RF concentrator hardware 315 and RF concentrator software 320. According to an aspect, the RF concentrator hardware 315 includes an independent SDR that operates to receive and process signals from one or more RF sensors 112, and saves raw data corresponding to detected signals in a local database. The RF concentrator software 320 provides functions for the RF concentrator hardware 315 when executed by one or more processors of the RF controller 115 including, but not limited to, receiving data from the various connected sensors in the sensor network, comparing signals to pre-stored signatures in a local database, sending results of comparisons, and assembling RF fingerprints in the disclosed format to the EM persona engine 120.

EM Persona Engine Architecture

FIG. 4A illustrates an example EM persona engine 120, constructed in accordance with aspects of this disclosure. The EM persona engine 130 may be a computer-implemented system that receives RF fingerprint data, a/k/a RF fingerprint feeds, from one or more RF controllers 115 in a system 100, and generates EM personas in the manner described herein. In general, the EM persona engine 120 receives signals from multiple RF controllers 115 that represent the detection of EM emissions from various electronic devices 10 (which may or may not be associated with a single AUS or with a single entity), and correlates multiple RF fingerprints to establish the existence of an EM persona. For example, many current smartphone models may have multiple different types of radios, which can be in various states of operation at different times of day. For example, current models of the APPLE iPhone® are known to have wireless cellular 2G/3G/4G/LTE for voice and data traffic (GSM/UMTS/CDMA), Wi-Fi, and Bluetooth. These different radios may or may not be transmitting at a given instant when in the field of coverage of an AUS. However, the various radios may turn on and communicate while in a related AUS within the overall detection area of the system 100. Therefore, in most cases, each electronic device will generate a plurality of RF fingerprints representing transmissions of one or more of the various radios on a device 10, within a given time period. Further, the location information associated with these signals further evidences a physical association of the various different radios. Thus, the EM persona engine 120 may be operative to process multiple RF fingerprints received at the same or different RF sensors 112 and/or at the same or different RF controller 115, and determine that a certain grouping of radios typically appears at or about the same time window and/or at or about the same location, and can therefore logically be assumed to be a part of the same physical electronic device, e.g. an APPLE iPhone® or iPad®, or a Samsung Galaxy®.

Referring now to FIG. 4B, the output of an EM persona engine 120 is a data set or schema representing an EM persona, having data items including, but not limited to, the following data items: Persona identifier, e.g. a unique identifier corresponding to the EM persona; Entity name, e.g. the name of the entity (if previously determined or assigned externally); Device identifier information, e.g. this EM persona relates to an APPLE iPhone 5S®; One or more pointers to one or more RF fingerprint data structures from EM transmissions underlying the determination of this EM persona; Time of creation of the EM persona; Last modified time of the EM persona; Location information corresponding to at least one detected location of the EM persona. The EM persona data structure is provided to the super persona engine 130, as will be described in more detail hereinafter.

Super Persona Engine Architecture

FIG. 5A is a block diagram illustrating various aspects of a super-persona engine 130 of the system 100, constructed in accordance with aspects of this disclosure. The super-persona engine 130 may receive data corresponding to EM personas from one or more EM persona engines 120, and may construct an abstraction representing an entity 20 associated with one or more EM personas. For example, a super persona data structure may represent an entity such as an individual, vehicle, asset, or building, which can possess one or more EM personas. In the case of an individual, a super-persona may have in his or her possession, at a given time, a smartphone, a tablet, a laptop PC, a wireless headset, a wireless fitness or health device, etc. One or more of these devices will have emitted an EM signal in order to be detected as an EM persona, which may then be associated with a super-persona. Multiple devices 10 may actuate and transmit at various times while in the possession of the entity 20, be detected in the system 100, and be determined by the super-persona engine 130 to be associated with the particular entity 20. Typically, behaviors of the entity 20 may be determined as a function of the identity of the entity, and the behavior of the entity as represented by the various EM personas detected in the AUS over a sufficient period of time for a behavior to be identified. The super-persona engine 130 is a computer-implemented system that processes EM persona data received at various times from various sensors in the sensor network 110, and generates a super-persona data structure. Data representing super-personas may be stored in the super persona database 510, which is accessed and maintained in accordance with routines as described in connection with FIG. 5B. The super-persona database 510 may also be accessed by the behavioral engine 140, as will be described in more detail hereinafter.

Referring now to FIG. 5B, a super persona data structure or schema is stored in the database associated with the super persona engine 130, and includes data items including but not limited to the following data items: Super persona identifier, e.g. a unique identifier corresponding to the super persona; Entity name, e.g. the name of the entity as either determined by the engine or by data input by a system user; Pointers to one or more EM personas that were used to determine the super persona; Pointers to one or more device identifiers, e.g. this super-persona has an Apple 5S iPhone®, an iPad Air®, a Dell Inspiron® laptop PC, a Bluetooth wireless headset, etc.; Time of creation of this super-persona; Last modified time of this super-persona; Behavior expectation/status flags, i.e. this super-persona is authorized for a function, is known "bad," is "unknown," has been seen in erratic behavior; Association information, i.e. this super-persona is related to one or more other super personas (such as family members, organizational membership information, etc.); Expected location information, i.e. the presence of this super-persona in a specific location is expected and approved; Unauthorized location information, i.e. the presence of this super persona in a specific location is not expected and is unauthorized; Prior incident data, i.e. data corresponding to prior detected behaviors of this super persona.

In example embodiments, the super-persona engine 130 may be configured to identify a super-persona that may be stored in a super-persona database 510. The super-persona data store 510 may contain a mapping of entities 20 with their corresponding EM personas and/or other security indicators (e.g., RFID badge identifier, employee, number, name, supplementary biometric information, government issued identifiers, etc.). For example, a particular entry in the database 510 may include an individual's name, address, employee identification number, RFID access card number, smartphone WiFi identifier, smartphone BT identifier, tablet computing device WiFi and BT identifiers, and smartwatch WiFi, NFC, and BT identifiers. This database 510 of super-personas may be used by the super-persona engine 130 to identify an entity 20 based at least in part on the entities' various EM personas and/or other security identifiers.

The super-persona engine 130 may further be configured to maintain, update, and provide access to the super-persona database 510. This may entail, at least in part, updating super-personas based on input from one or more administrators of the system 100 or the super-persona engine 130. In some example embodiments, the super-persona database 510 may be updated based on input from a different engine (e.g., EM persona engine 120 or the behavioral engine 140).

In example embodiments, the behavioral engine 140 may be configured to access the persona database 510 to identify various types of disallowed locations, times, and/or other behaviors associated with the various super-personas stored in the super-persona database 510. In further example embodiments, the behavioral engine 140, in addition to the super-persona engine 130, may be configured to update the super-persona database 510 to include additional information therein, such as new EM personas and/or fingerprints to be associated with a particular super-persona and/or recordings of infractions or unusual events (e.g., presence in an unauthorized location, comingling with an unauthorized entity, erratic movement in sensitive AUS, etc.) associated with a particular entity 20 and/or his/her/its super-persona.

Behavior Engine Architecture

FIG. 6 illustrates a behavior engine 140 and associated components, in accordance with example embodiments of the disclosure. The terms "behavioral engine" and "behavior engine" may be used interchangeably herein. As described above, the super-persona engine 130 may be a computer-implemented system that receives EM personas, generates a super-persona for detected devices, determines other characteristics or attributes of a super-persona based at least in part on the occurrence of multiple EM personas and device activity, and maintains a database 510 of super-persona data that represents an entity 20, its devices 10, and its detected behaviors. In order to affect security policies for specific super-personas, a behavior engine 140 may have access to the super-persona database 510 to retrieve super-persona data and determine whether a particular entity 20 is complying with rules or policies established for/by the owner/operator of the system 100. Failure to comply with rules or policies, or detection of unknown entities (e.g. unknown super-personas or EM personas), or detection of certain specific behaviors, may result in generation of an alarm or alert to security personnel, via an output of the system 100, for appropriate further awareness or handling and/or a logging of the incident.

In particular, a behavior engine 140 according to aspects of this disclosure may also be a computer-implemented system that executes a number of software instructions to execute processes to enable the detection of wanted and unwanted behaviors, compliance or noncompliance with predetermined policies, and generation of alerts or alarms for handling by appropriate personnel of the organization deploying the system 100. According to an aspect, the behavior engine 140 maintains a detection episodes database 520, which stores data corresponding to various super-personas and their detected behaviors, over particular time periods, to facilitate the application of rules or policies for determining behavior of the entity. In example embodiments, the behavior engine 140 may be configured to provide behavior related information and/or warnings in real time or near-real time, such that a potential security threat may be investigated relatively rapidly, such as while still in progression.

In example embodiments, the behavior engine 140 may reside relatively remotely from the AUS (e.g., in the cloud, at a third party site, etc.). In these example embodiments, when the behavior engine 140 detects a potential security issue, the behavior engine 140 may be configured to transmit a message and/or warning to security personnel and their respective user devices at or near the facility and AUS being monitored. For example, if the behavior engine 140 detects a potential security breach (e.g., unauthorized presence, unauthorized comingling, tailgating, etc.), the behavior engine 140 may be configured to indicate the transgression via a local on-site device that is actively monitoring data generated by the behavior engine 140 in a thin client-type configuration. Furthermore, the behavior engine 140 may be configured to push a warning message to an authorized user device that may not be in active communication with the behavior engine 140. For example, the behavior engine 140 may be configured to transmit a text message to a security personnel on his/her user device at a site being monitored, where the text message may indicate any one or more of the nature of the infraction(s), location of the infraction(s), entit(y/ies) 20 involved in the infraction(s), device(s) 10 involved in the infraction(s), or the like. In still further example embodiments, the behavior engine 140 may be communicatively coupled to one or more surveillance equipment and may be configured to control such equipment to collect evidence of potential disallowed behaviors. For example, the behavior engine 140 may be configured to remotely control one or more security cameras and automatically point the cameras at any of a variety of potential security infractions. This type of automated and/or semi-automated control may be beneficial to security personnel, such as in a security camera room with multiple closed circuit camera feeds, to hone in on potential security issues.

According to example embodiments, the detection episodes database 520 stores data corresponding to a history of events or episodes of a particular super-persona, which facilitates the determination of normal, seen, and expected behavior for certain super-personas. According to another aspect, the behavior engine 140 also maintains a behavioral signatures database 540, which comprises a set of preprogrammed behavioral profiles of acceptable or unacceptable behavior of an entity, including locations that are considered "off limits" to particular entities, locations that an entity is considered authorized to enter, and/or associations with other entities that may be considered suspicious or otherwise worthy of attention by an alert or direction of security resources such as surveillance cameras. The behavioral signatures database 540 is typically constructed by a system administrator or other authorized user of the system 100, which engages with the system 100 to input behavioral signature data. By way of example (and not of limitation), a particular entity such as a male child could be authorized for "normal behavior" when in certain classrooms, the lunch room, the boys' restroom, and/or the hallway to the main entrance, but could be unauthorized in the girls' room, the janitor's closet, a back entrance to the school, or seen as exiting the school's premises at unusual times or at locations on the school campus that are unexpected. In such cases of "normal" behavior, the behavior engine can record episodes of normal behavior over time, and in cases of unexpected or unauthorized behavior or presence, an alert or alarm can be issued, and the factual details of the super-persona representing the male child may be recorded in the detection episodes database 520.

According to an aspect, the behavior engine 140 receives supplemental identifying information to be used in conjunction with EM persona information, super persona information, and detection episode data to affect other purposes. By way of example, but not of limitation, the behavior engine 140 can be connected for network communications with a "known offenders" database 132 that stores information identifying the EM personas and/or super-personas of terminated employees. The behavior engine 140 can use this supplemental information as a part of a behavior signature in the behavioral signatures database 540 to issue an alarm or alert in response to detection of an EM persona and/or super-persona corresponding to such persons identified in this manner. Similarly, and according to a similar aspect, the behavior engine 140 may receive supplemental identifying information that can be used in conjunction with EM persona information, super-persona information, and/or detection episode data to affect other purposes such as building or facilities access, securing, evacuation, and the like. As one example, but not of limitation, a building or facilities access control system 550, which receives access control information from "card swipe" or RFID type facilities access, provides ancillary identification (ID) information to the behavior engine 140. Typically, the access control system has information identifying a particular individual (one entity) who is authorized to enter/access a building or facility (another entity). The coupling of the ancillary ID information from an access control system with EM persona data and super persona data allows inclusion of an additional level of behavior awareness and policy control over facilities, as will be described in various application scenarios in more detail hereinafter.

It will be appreciated that the behavior engine 140 may be configured to execute algorithms on presence, location, and time series collected and/or logged data to identify normal and abnormal behaviors. The behavior engine 140 may utilize machine learning algorithms to identify the EM persona and/or super-persona behaviors of various EM personas and super-personas associated with entities 20 being monitored over time and space. For example, temporal and/or spatial locational correlation between two or more entities 20 or an entity 20 and particular locations may be determined over time to identify normal behavior of one or more entities 20. Divergences in this normal behavior may be measured, such as by variation in a correlation from an expected value, and compared to threshold(s) to identify potential security issues. As a non-limiting example, the behaviors of a particular entity 20 may be monitored over a period of time to identify locations that the entity visits at certain times (e.g., meeting at board room on Mondays at 9 AM, etc.), other entities 20 with which the entity is in the presence of (e.g., lunch with coworkers at noon every weekday, etc.), or the like. Such normal behavior may be determined and stored for particular entities 20 and substantial divergences from the normal behavior may be flagged for potential security issues. Referring still to the previous example, if a divergence is detected where the entity does not have lunch with coworkers 20, the divergence from the normal may not rise to a level to trigger an alarm. However, if the entity is comingling with another set of employees with whom he is not usually associated for a period of multiple days, resulting in a divergence from a number of temporal and/or spatial cross-correlations with other entities beyond corresponding respective threshold levels, then the divergence may be flagged and may be investigated further, such as at the discretion of security personnel.

From the foregoing, it will be understood and appreciated that an EM persona assessing, identifying, and protecting system 100, constructed as described herein, has many different applications for many different safety and security purposes. Next will be described a number of different application scenarios that can be readily effected by those skilled in the art, based on the disclosure and teachings contained herein.

Application Scenario—Campus Persona Awareness

FIG. 7 illustrates an example campus persona awareness scenario, according to an aspect of this disclosure. In this scenario, a secure campus is provided by use of a system 100 constructed as described herein. A campus can be a school, university, commercial enterprise, shopping center, collection of residences, or any other similar predefined area for identification and protection. In accordance with an aspect, sensors capture the EM personas of persons (individuals) and/or their associated vehicles. It is known that many modern vehicles possess a number of EM signal emitting devices, such as OnStar, EZ Pass, and toll road payment devices. The EM personas are captured and monitored as they enter and move about the campus. A super persona is established for the individual and any associated devices, including those on the vehicle. The behavior engine 140 determines and establishes a risk profile for a determined super persona, based on prior (historical) data derived from the detection episodes database (if the entity has been seen before) and/or any associated EM personas. A more cautionary risk profile and "threat level" is established for an unknown entity, and an alarm/alert risk profile or threat level is established for a known "bad" entity. The behavior engine 140 then issues appropriate warnings, messages, security alerts, etc. to security personnel if the risk profile is sufficiently great, and continues to check the movements of the entity as they move about the campus. Alerts or alarms may be issued in a number of different ways, e.g. web, text, telephone call, etc.

Application Scenario—Use of EM Personas without Super-Persona

FIG. 8 illustrates an example EM persona assessing, identifying, and protecting scenario, according to an aspect of this disclosure, in which EM personas are used directly for security and safety detection and identification, without necessarily establishing a super-persona prior to taking action. In this scenario, a collection of mobile devices 10 is detected by the sensor network 110. The RF fingerprints of the various devices are provided to the EM persona engine 120, as described above. However, in this scenario, the EM persona data is provided directly to the behavior engine 140, for direct processing to determine if any EM persona of a detected device corresponds to a known person of interest (either on a "black list" of excluded or high risk persons or on a "white list" of approved and authorized persons). Likewise, the EM persona data can be directly utilized in a behavior signature, without necessarily first being associated with a super-persona. Therefore, it will be appreciated that security risk detection and policy enforcement may be performed, in accordance with this aspect, directly from EM persona data, rather than having to identify a corresponding super-persona.

Application Scenario—Persona Behavior Detection

FIG. 9 illustrates an example persona detecting scenario, according to an aspect of this disclosure, in which an entity 20, such as an individual 20, is detected as possessing erratic behavior, or entering an unauthorized or prohibited area, or is determined as unknown and thus subject to increased scrutiny in awareness. As shown at block 901, an entity with multiple electronic devices enters a facility at an ingress point, such as a card access entryway to a building. The entity 20 is determined, based on the EM personas of their devices 10, coupled with access control information, to be an identified, authorized person, with permitted access to the facility.

As shown at block 905, other and unknown entities, person #1 and person #2, are detected from their EM personas as having entered the facility through a non-controlled entrance, such as a fire exit, a window, a door propped open, etc. These unknown persons have EM personas but no known super-persona, and are thus subject to particular scrutiny by video surveillance and perhaps by dispatch of security personnel.

As shown at block 910, a number of entities (eight in the example shown), each having distinct EM personas, and perhaps having known super-personas, are detected as moving at twice the normal walking speed within an office space. Such behavior is consistent with a medical emergency, criminal activity, or other alarming circumstance and would warrant increased video surveillance and/or security or safety personnel dispatch.

As shown at block 915, an entity having an EM persona and known to be otherwise authorized to be in the facility is detected as present within a banking zone of an investment banking facility. In this example, the system 100 has been configured to enforce a "Chinese wall" exclusionary policy where equity research personnel that work for the bank are forbidden from entering the banking zone, due to legal compliance considerations based on securities or banking laws. The detection of one or more EM personas of the individual, or super-persona of the individual, triggers an alarm or alert of unauthorized presence in a particular forbidden area.

As shown at block 920, an unknown person having an unknown EM persona or super-persona is detected as present in an unauthorized area only permitted to "known" personas. The detection of one or more EM personas of the unknown individual, or super-persona of the individual, triggers an alarm or alert of unauthorized presence in a particular forbidden area.

Application Scenario—EM Persona Detection Deployment in Secure Lobby

FIG. 10 illustrates an example deployment of sensors 112 for a multi-stage security application to supplement conventional access control systems (e.g. card swipe, RFID, etc.) and provide additional safety and security awareness. FIG. 10 shows a facility's reception area 1001 with an initial access control gate 1005, elevator bank 1010, and internal access control gate 1020 that controls access to a secure lobby. In accordance with one aspect, multiple RF sensors 112 are deployed in the regions of the initial access gate 1005, the elevators, and the secure lobby access gate. For example, the sensor 112a is positioned to detect electronic device emissions at the initial access gate 1005 as people are permitted access to the reception area 1001. A second sensor 112b is positioned to detect electronic device emissions from persons entering elevators. A third sensor 112c is positioned to detect electronic device emissions form persons entering or attempting to enter the secure lobby. In accordance with an aspect, the EM personas of persons coming and going through the initial entrance, the elevators, and the secure lobby area are captured and saved in the detection episodes database, as described herein, for alert and alarm purposes, as well as forensic investigation in the event of a security violation or similar incident.

FIG. 10 also illustrates an example security alert invoking behavior in the form of disallowed comingling. Suppose employees 1030, 1032 from two departments, such as a regulatory department and an advocate department, respectively, were not allowed to intermingle or at least disclose any such interactions. In this case, employee 1030 may be of a regulatory nature and, therefore, adverse to a party and employee 1032 may be an advocate of that very party. Such differing positions in the same company/organization may result in conflicts of interest if there are no compliance rules involved that may disallow collusion between the two employees 1030, 1032. Out of an overabundance of caution, an organization may disallow interactions between such employees 1030, 1032 with each other. In this case, even though both employees 1030, 1032 may be individually allowed to be in this secure lobby area, if it is detected that there is a relatively high correlation (temporal and/or spatial correlation) in the presence of the two employees 1030, 1032, it may result in a potential security violation.

According to another aspect, FIG. 11 provides further example details as to the manner in which a digital or EM persona is constructed by the combination of information from an ancillary source such as access control system. As shown, identifying information from an employee identification/access control badge, used for access control and authorization, is combined with EM persona information obtained from the EM signals emitted by the various electronic devices 10 in possession of an individual 20 to construct a digital persona, also called a super-persona herein. As shown, a confidence index that relates to the individual can be constructed and stored, e.g. the same devices (EM personas) 10 and access control employee badge have been seen in association 8 times in the past two weeks, giving a high level of confidence (e.g. 98.2%, as an example) that the particular individual is authorized, authenticated, and will be expected to recur in the future. In this case, the systems and methods, as described herein, may proceed to associate the EM personas resulting from the detected devices 10 with a super-persona of the employee 20.

Application Scenario—Visitor Digital Persona

FIG. 12 illustrates example details of generating a visitor digital persona (EM persona and/or super persona) in response to detection of EM emissions from devices 10 carried by a person 20 visiting a facility that deploys a system 100 as described herein. In a manner similar to that described above for an employee 20 with an identification badge, a visitor's electronic devices are detected and EM personas determined. The visitor presents identification to an attendant, who in this example has access to an administrator's function or data entry function for entering visitor identification information. The visitor's identification information can be combined with the EM persona information to create a visitor super-persona, which can persist in the system indefinitely (or until data retention policies purge visitor information). In such an application, if an EM persona that is associated with the visitor reappears on a subsequent occasion after the visit, the system allows more rapid identification of the person carrying the electronic device associated with the EM persona, which can be useful for alarm or forensic investigation in the occasion of an incident.

Application Scenario—Tailgating Policy Enforcement Using Digital Persona

FIG. 13 illustrates example details of area access control and behavior policy enforcement based on digital personas (EM personas or super-personas), according to example embodiments of the disclosure. In accordance with an aspect of the disclosure, visitors to a monitored facility are flagged (i.e. promoted within an alarming process to a higher attention status) in the event of detection in an unauthorized area. In such a case, an "area alert" is issued by the behavior engine.

According to another aspect, a behavior known as "tailgating" is detected and an alarm issued. In this example, a tailgating alert is issued in response to detection to two different super-personas, or multiple EM personas that have not been associated with a single super-persona (and may or may not be properly associated with a single individual), coupled with information indicating that only a single individual has "badged in", i.e. obtained access to the facility by use of his or her access control card. The occurrence of multiple, previously unknown or unseen EM personas for the particular individual suggests that a first person may have properly entered, but a second and unauthorized person may have also entered by closely following the authorized person through the access control gate. Such a behavior is known as "tailgating." Potential tailgating offenders may be tracked and/or may be subject to greater security scrutiny based at least in part on past infractions. This may include tracking the EM persona associated with the entity that did not perform an access action (e.g., RFID card presentation/ swipe) and/or the individual that may have inadvertently or purposely allowed the tailgating to happen using his/her access activity (e.g., RFID card presentation/swipe).

Application Scenario—Erratic Behavior Enforcement Using Digital Persona

FIG. 14 illustrates example details of behavior policy enforcement based on digital personas (EM personas or super-personas) for erratic behavior and/or unauthorized presence by a former employee. In accordance with an aspect of the disclosure, people travelling a speed greater than is normally expected for an office environment are detected. An incident of multiple people, detected by their EM personas, moving at a high rate of speed such as running through the office is suspicious and may be indicative of a medical or other emergency, a criminal incident occurring, a fire, or other undesirable occurrence. In such a case, an "erratic behavior alert" is issued by the behavior engine 140. In accordance with another aspect, a former employee is detected as remaining on the premises or re-entering the premises. Again, in this case, if the behavior engine 140 is located off-site (e.g., in the cloud) an alert may be issued to a user device on site or on the person of one or more security personnel that may be on-site. In addition, in some example embodiments, the behavior engine 140 may proceed to notify law enforcement authorities and/or emergency responders.

In further example embodiments, employees terminated for cause may be entered into a "black list" of super personas, such that their appearance in any area under surveillance is considered a policy violation. In such a case, a "black list alert" is issued by the behavior engine.

Application Scenario—Evacuation Measures Using Digital Persona

FIG. 16 illustrates example details of use of the system 100 for securing a building or facility evacuation based on digital personas (EM personas or super personas). As shown in the figure, a number of RF sensors are deployed in a building in various locations on the floor, so as to detect EM emissions from employee devices. As shown, an emergency incident has occurred, as reflected by a fire alarm pull on the 8th floor, NE corner, at 8:42 AM. In this example, the fact and time of the fire alarm pull are received by security personnel, and an evacuation alarm is issued for the building. In accordance with an aspect, the system 100 is configured to take and save a "snapshot" of the EM personas and/or super personas that are detected at the time of the fire alarm pull. This snapshot forms a personnel list to ensure that all detected personnel have evacuated the building. The snapshot also provides for counting the people in various areas on the floor where the incident occurred.

In accordance with another aspect, the movement of the EM personas and/or associated super-personas is detected and recorded during the evacuation. This permits both accounting for personnel, and possible determination of medical issues with a detected EM persona that is indicated as moving at a slow rate or as having stopped before evacuation.

Application Scenario—Behavior Detection and Enforcement Using Digital Persona—White/Green List Vs. Red/ Black List FIG. 17 illustrates example details of behavior detection and enforcement based on digital personas (EM personas or super personas) for known persons indicated as permitted/ authorized, as well as known persons indicated as not permitted or as constituting known security threats. In this example, known persons can be entered as known super personas through various manners such as pre-registration of known persons and their electronic devices or through a registration process where identifying information of an individual is entered into the system 100 and at the same time EM persona information is captured by an RF sensor deployed at the registration terminal or office. Similarly, individuals can be identified via a "registration" type event such as their initial access (badge-in) to a facility, coupled with a scan and capture of their EM personas. In both such cases, the individual is considered known and authorized, at least at the registration event. The identities of such persons are associated with their EM personas and super-persona, which are then placed on a "green list" (sometimes called a "white list") of currently authorized and known personnel.

In a similar manner, a list of known persons who have been identified as undesirable, such as terminated employees, can be assembled into a "red" list (sometimes called a "black list"). If available, EM personas associated with such persons may be captured if present during a scan by the sensor network or if available from other sources. In accordance with this aspect of the disclosure, the detection of an EM persona of a person on the red list at any place in the area(s) under surveillance may result in the issuance of an alert or alarm, increased visual surveillance, and/or dispatch of security personnel.

According to another aspect of the disclosure, the system 100 includes processes or routines for dynamic persona management, both of EM personas and super-personas. Dynamic persona management relates to the notion that an entity will have a persona representing one or more EM-emitting devices that exist in a certain configuration at a particular point in time, but those devices may be in various states of (a) activation, i.e. they may be on or off, (b) possession, i.e. the entity may have not brought all the devices with them at a particular point in time or place, and (c) configuration, i.e. a person may have a certain model of device such as an iPhone 4S®, but recently upgraded their device to an iPhone 5S® or a Samsung Galaxy®. In these cases, the system is operative to determine, either automatically based on detection over a period of time, or through an interactive process with the entity, that aspects of the persona should be updated to reflect a new set of devices or configurations.

According to one aspect, a dynamic persona management process executing in the EM persona engine 120 is operative to persist a specific EM persona for a particular device, during a detection episode, so long as at least one RF/EM signature from the device 10 is received within a predetermined time period, e.g. one hour. Absence of a signal from any radio from the particular device 10 after passage of this predetermined time period indicates one or more of the following statuses: (a) the device is off or in airplane mode, (b) the entity associated with the device has left the AUS, (c) the device is malfunctioning, or (d) for some other reason is inactive. The EM persona will then be provided with a status of "inactive" for a second predetermined period of time, during which a reappearance of an EM emission from any of the associated radios will place the EM persona back into an "active" status, and the location of the EM persona updated.

In a similar fashion, a dynamic persona management process executing in the super-persona engine 130 is operative to persist a specific super-persona for a particular device 10 during a detection episode, so long as at least one active status EM persona from a device 10 is persisted within a predetermined time period, e.g. one hour. Absence of a signal from any radio from any device associated with the super persona after passage of this predetermined time period indicates one or more of the following statuses: (a) all devices of the super persona are off or in airplane mode, (b) the entity associated with the super persona has left the AUS, (c) one or more devices are malfunctioning, or (d) for some other reason the super persona is inactive. The super-persona will then be provided with a status of "inactive" for a second predetermined period of time, during which a reappearance of an EM persona associated with the super persona will place the super-persona back into an "active" status, and the location of the super persona updated.

FIG. 18 is an example block diagram of RF sensor network deployment, according to example embodiments of the present disclosure. As depicted, in example embodiments, the sensors may be spatially located in a manner such that there is full or nearly full coverage of the AUS. There may be overlap in the radio range of each of the RF sensors, as shown here to ensure full or near full spatial/volumetric radio coverage of the AUS. The radio range in this context, may pertain to the farthest distance from a particular RF sensor over which an RF signal may be detected and sufficiently amplified (e.g., by a low noise amplifier (LNA of the RF sensor) to a level with a sufficiently low signal-to-noise-ratio (SNR) that the RF signal may be identified, demodulated, and/or decoded. The overlap of radio range of the various RF sensors may mean that a particular device 10 and its RF signature may be detected at more than one RF sensor at substantially the same time. The RF controller 115, in this case, may be configured to identify the redundant identification of the device 10 and filter those redundancies prior to providing the EM persona information to the EM persona engine 120, super-persona engine 130, and/or behavior engine 140. As discussed above, in some example embodiments, the RF sensors may operate as a mesh network to relay its RF detection information to a nearest (or close-enough) neighbor that may further relay the information to another RF sensor(s) and/or eventually to the RF controller 115. The RF controller 115, at that point, may process the received information and relay the same to a local or remote server, such as a remote server providing the functionality of one or more of the EM persona engine 120, super-persona engine 130, and/or behavior engine 140.

In example embodiments, when the RF sensors operate in a mesh configuration, data transmission between RF sensors and the RF controller 115 may be encrypted, such as to prevent snooping of communications. In some cases, a public-private key-type encryption mechanism may be used between various RF sensors and/or the RF controller.

In some example embodiments, an RF sensor may be able to provide an indication if there is tampering and/or attempted tampering of that RF sensor. The RF sensor may have mechanisms to provide such indicia of tampering on the RF sensor itself (e.g., speakers, lights, etc.) that may draw attention to the RF sensor, indicating that the RF sensor may have been tampered with. In other example embodiments, the RF sensor may be configured to communicate (e.g., wirelessly or hardwired) to other RF sensors and/or the RF controller 115 indicating possible tampering. These indications may ultimately be provided to authorities of the system 100 (e.g., administrators, security personnel, etc.) to investigate possible tampering.

In some example embodiments, each of the RF sensors may be GPS locked to a particular location. In other words, the RF sensor may not be operative (e.g., locked out) if GPS or other location information indicates that the RF sensor is not in a predetermined location. By having a locational-lockout, the system 100 may be configured to identify that all of the RF sensors are in their proper deployed locations and functional and that there are no inadvertent gaps in coverage. Also, in example embodiments, RF sensor RSSI-based triangulation may be used to identify the location of an entity 20, or at least its RF emissions, within the AUS. In other words, measurement of the RSSI from more than one RF sensor, along with knowledge of the location of each of the more than one RF sensor may be used to triangulate the location of the electronic device for which an RF signal is detected. If the RF sensor(s) are moved, then having the incorrect location for the new position of the RF sensor(s) may result in inaccurate triangulation-based location determination of the devices 10. In some cases, particularly when these RF sensor(s) are deployed in indoor locations, it may not be possible to dynamically update their current locations based on GPS or other global navigation satellite system (GNSS) signals. Therefore, in these cases, other mechanisms for dynamically updating the RF sensor positions may be needed (e.g., AP-based triangulation, inertial sensors, manual updates, etc.) or it may be important that the RF sensors stay put. Furthermore, a GPS or location-based lockout of the RF sensors may ensure that the surveillance mechanisms described herein are performed by authorities in locations where they are authorized to perform such activities (e.g., an employee site, locations where people may not have a reasonable expectation of privacy, etc.). As an example, such types of locational-lockout may prevent the deployment of such systems 100 in public places or in locations that are not controlled/owned by the entity deploying and using the system 100.

From the foregoing, it will be understood that various aspects of the processes described herein are software processes that execute on computer systems that form parts of the system 100. Accordingly, it will be understood that various embodiments of the system described herein are implemented as a special purpose computers including various computer hardware as discussed in greater detail below. Embodiments within the scope of the present disclosure also include computer readable media for carrying or having computer-executable instructions or data structures stored thereon. Such computer-readable media can be any available media which can be accessed or from which computer-executable instructions or data can be downloaded through communication networks. By way of example, and not limitation, such computer readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a suitable computing device.

When information is transferred or provided over a network or another communications connection (either hardwired, wireless, or a combination of hardwired or wireless) to a computer, the computer properly views the connection as a computer readable medium. Thus, any such connection is properly termed and considered a computer-readable medium. Combinations of the above should also be included within the scope of computer-readable media. Computer-executable instructions comprise, for example, instructions and data which cause a special purpose computer or special purpose processing device such as a mobile device processor to perform one specific function or a group of functions. Those skilled in the art will understand the features and aspects of a suitable computing environment in which aspects of the disclosure may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. The invention may be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, may include a processing unit, a system memory, and a system bus that couples various system components including the system memory to the processing unit. The computer may include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements functionality described herein may comprise one or more program modules that may be stored on the hard disk, solid state drive, or other storage medium. This program code may include an operating system, one or more application programs, other program modules, and program data. A user may enter commands and information into a computer through various input devices such as, for example, a keyboard, touch screen, pointing device, a script containing computer program code written in a scripting language, or other input devices (not shown), such as a microphone, etc. These and other input devices may be connected to the processing unit through known electrical, optical, or wireless connections.

A computing device used in connection with various aspects of the described processes may operate in a networked environment using logical connections to one or more remote computers or data sources, which are described further below. Remote computers may be another personal computer, a server, a router, a network PC, a peer device or other common network node, and may include many or all of the elements described above relative to a computer system in which the inventions are embodied. The logical connections between computers may include a local area network (LAN), a wide area network (WAN), and wireless LANs (WLAN) that are presented here by way of example and not limitation.

When used in a LAN or WLAN networking environment, a computer system implementing aspects of the disclosure may be connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote memory storage device. It will be appreciated that the network connections described or shown are exemplary and other mechanisms of establishing communications over wide area networks or the Internet may be used.

In view of the foregoing detailed description of example embodiments of the disclosure, it will be appreciated that additional aspects, features, and methodologies of the disclosure will be readily discernible from the description herein, by those of ordinary skill in the art. Many embodiments and adaptations of the disclosure other than those herein described, as well as many variations, modifications, and equivalent arrangements and methodologies, will be apparent from or reasonably suggested by the disclosure and the foregoing description thereof, without departing from the substance or scope of the claims.

Furthermore, any sequence(s) and/or temporal order of steps of various processes described and claimed herein are illustrative and non-limiting. It should also be understood that, although steps of various processes may be shown and described as being in a particular sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the disclosure. In addition, some steps may be carried out simultaneously. The embodiments were chosen and described in order to explain the principles of the disclosure and its practical application so as to enable others skilled in the art to utilize embodiments of the disclosure. Alternative embodiments will become apparent to those skilled in the art to which the present disclosure pertains without departing from their spirit and scope.

What is claimed is:

1. A system, comprising:
   a transceiver;
   at least one memory that stores computer-executable instructions; and
   at least one processor operationally coupled to the transceiver and the at least one memory, wherein the at least one processor is configured to access the at least one memory and execute the computer-executable instructions to:
      receive a radio frequency (RF) fingerprint of an RF signal detected by the transceiver within an area under surveillance (AUS), the RF fingerprint comprising at least one of: i) a hardware address of an electronic device that emitted the RF signal or ii) a radio type identifier of a radio of the electronic device;
      determine a stored persona that includes a stored RF fingerprint that matches the received RF fingerprint;
      determine that the electronic device that emitted the RF signal is associated with the stored persona and identify a user associated with the stored persona;
      identify, from the stored persona, access credentials of the user, wherein the access credentials provide access to one or more ingress points of the AUS via one or more access control devices;
      receive access control information indicating that the access credentials have not been received at any of the one or more access control devices; and
      determine that the user is in violation of a security protocol based at least in part on receipt of the RF fingerprint and receipt of the access control information indicating that the access credentials have not been received.

2. The system of claim 1, wherein the at least one processor is further configured to execute the computer-executable instructions to generate an alert indicating the violation of the security protocol.

3. The system of claim 1, wherein the at least one processor is further configured to execute the computer-executable instructions to:
   determine, based at least in part on the stored persona, that the user is authorized to be in the AUS.

4. The system of claim 1, wherein the at least one processor is further configured to execute the computer-executable instructions to:
   determine, based at least in part on the stored persona, that the user is unauthorized to be in the AUS; and
   generate an alert indicating that the user is present in the AUS.

5. The system of claim 1, wherein the AUS is a first AUS and the user is authorized to be in a second AUS.

6. A system, comprising:
   a transceiver;
   at least one memory that stores computer-executable instructions; and
   at least one processor operationally coupled to the transceiver and the at least one memory, wherein the at least one processor is configured to access the at least one memory and execute the computer-executable instructions to:
      receive a first radio frequency (RF) fingerprint of a first RF signal detected by the transceiver within an area under surveillance (AUS), the first RF fingerprint comprising at least one of: i) a hardware address of a first electronic device that emitted the first RF signal or ii) a first radio type identifier of a first radio of the first electronic device;
      determine a first stored persona that includes a first stored RF fingerprint that matches the received first RF fingerprint;
      determine that the first electronic device that emitted the RF signal is associated with the first stored persona and identify a first user associated with the stored persona;
      identify, from the first stored persona, first access credentials of the first user, wherein the first access credentials provide access to one or more ingress points of the AUS via one or more access control devices;
      receive a second RF fingerprint of a second RF signal detected by the transceiver within the AUS, the second RF fingerprint comprising at least one of: i) a second hardware address of a second electronic device that emitted the second RF signal or ii) a second radio type identifier of a second radio of the second electronic device;
      receive, from at least one of the one or more access control devices, access control information including second access credentials matching the first access credentials;
      determine that a first time at which the first RF signal is detected by the transceiver is within a threshold period of time from a second time at which the second RF signal is detected by the transceiver;
      determine that a first position from which the first RF signal is emitted is within a threshold distance from a second position from which the second RF signal is emitted;
      determine that a second user of the second electronic device entered the ingress point of the AUS in violation of a security protocol; and
      generate an alert indicative of the determination that the second user of the second electronic device entered the AUS in violation of the security protocol.

7. The system of claim 6, wherein the alert is a first alert and the at least one processor is further configured to execute the computer-executable instructions to:
   determine that the second RF fingerprint does not match a stored RF fingerprint included in any stored persona; and
   generate a second alert indicting that the second electronic device is unauthorized in the AUS.

8. The system of claim 6, wherein the alert is a first alert and the at least one processor is further configured to execute the computer-executable instructions to:
   determine that the second RF fingerprint matches a second stored RF fingerprint of a second stored persona;
   identify the second user based at least in part on the second stored persona;
   determine that the second user is unauthorized to enter the AUS; and
   generate a second alert indicting that the second user is unauthorized in the AUS.

9. The system of claim 8, wherein the AUS is a first AUS and the second user is authorized to be in a second AUS.

10. A method, comprising:
    receiving, by a security system comprising one or more processors, a radio frequency (RF) fingerprint of an RF signal detected by the transceiver within an area under surveillance (AUS), the RF fingerprint comprising at least one of: i) a hardware address of an electronic device that emitted the RF signal or ii) a radio type identifier of a radio of the electronic device;

determining, by the security system, a stored persona that includes a stored RF fingerprint that matches the received RF fingerprint;

determining, by the security system, that the electronic device that emitted the RF signal is associated with the stored persona and identify a user associated with the stored persona;

identifying, by the security system, from the stored persona, access credentials of the user, wherein the access credentials provide access to one or more ingress points of the AUS via one or more access control devices;

receiving, by the security system, access control information indicating that the access credentials have not been received at any of the one or more access control devices; and determining, by the security system, that the user is in violation of a security protocol based at least in part on receiving the RF fingerprint and receiving the access control information indicating that the access credentials have not been received.

11. The method of claim 10, further comprising generating, by the security system, an alert indicating the violation of the security protocol.

12. The method of claim 10, further comprising:
determining, by the security system and based at least in part on the stored persona, that the user is authorized to be in the AUS.

13. The method of claim 10, further comprising:
determining, by the security system and based at least in part on the stored persona, that the user is unauthorized to be in the AUS; and
indicating, by the security system, that the user is present in the AUS.

14. A method, comprising:
receiving, by a security system comprising one or more processors, a first radio frequency (RF) fingerprint of a first RF signal detected by the transceiver within an area under surveillance (AUS), the first RF fingerprint comprising at least one of: i) a hardware address of a first electronic device that emitted the first RF signal or ii) a first radio type identifier of a first radio of the first electronic device;

determining, by the security system, a first stored persona that includes a first stored RF fingerprint that matches the received first RF fingerprint;

determining, by the security system, that the first electronic device that emitted the RF signal is associated with the first stored persona and identify a first user associated with the stored persona;

identifying, by the security system, from the first stored persona, access credentials of the first user, wherein the access credentials provide access to one or more ingress points of the AUS via one or more access control devices;

receiving, by the security system, a second RF fingerprint of a second RF signal detected by the transceiver within the AUS, the second RF fingerprint comprising at least one of: i) a second hardware address of a second electronic device that emitted the second RF signal or ii) a second radio type identifier of a second radio of the second electronic device;

receiving, by the security system and from at least one of the one or more access control devices, access control information including the access credentials;

determining, by the security system, that a first time at which the first RF signal is detected by the transceiver is within a threshold period of time from a second time at which the second RF signal is detected by the transceiver;

determining, by the security system, that a first position from which the first RF signal is emitted is within a threshold distance from a second position from which the second RF signal is emitted;

determining, by the security system, that a second user of the second electronic device entered the ingress point of the AUS in violation of a security protocol; and generating, by the security system, an alert indicative of the determination that the second user of the second electronic device entered the AUS in violation of the security protocol.

15. The method of claim 14, wherein the alert is a first alert and further comprising:
determining, by the security system, that the second RF fingerprint does not match a stored RF fingerprint included in any stored persona; and
generating, by the security system, a second alert indicting that the second electronic device is unauthorized in the AUS.

16. The method of claim 14, wherein the alert is a first alert and further comprising:
determining, by the security system, that the second RF fingerprint matches a second stored RF fingerprint of a second stored persona;
identifying, by the security system, the second user based at least in part on the second stored persona;
determining, by the security system, that the second user is unauthorized to enter the AUS; and
generating a second alert indicting that the second user is unauthorized in the AUS.

17. One or more non-transitory computer-readable media storing computer-executable instructions that responsive to execution cause one or more computer processors to perform operations comprising:
receiving a radio frequency (RF) fingerprint of an RF signal detected by the transceiver within an area under surveillance (AUS), the RF fingerprint comprising at least one of: i) a hardware address of an electronic device that emitted the RF signal or ii) a radio type identifier of a radio of the electronic device;
determining a stored persona that includes a stored RF fingerprint that matches the received RF fingerprint;
determining that the electronic device that emitted the RF signal is associated with the stored persona and identify a user associated with the stored persona;
identifying, from the stored persona, access credentials of the user, wherein the access credentials provide to one or more ingress points of the AUS via one or more access control devices;
receiving, access control information indicating that the access credentials of the user have not been received at any of the one or more access control devices; and
determining that the user is in violation of a security protocol based at least in part on receiving the RF fingerprint and receiving the access control information indicating that the access credentials have not been received.

18. The one or more non-transitory computer-readable media of claim 17, the operations further comprising generating an alert indicating the violation of the security protocol.

19. The one or more non-transitory computer-readable media of claim 17, the operations further comprising determining, based at least in part on the stored persona, that the user is authorized to be in the AUS.

20. The one or more non-transitory computer-readable of claim 17, the operations further comprising:
   determining, based at least in part on the stored persona, the user is unauthorized to be in the AUS; and
   indicating that the user is present in the AUS.

* * * * *